(12) United States Patent
Oi et al.

(10) Patent No.: US 10,546,401 B2
(45) Date of Patent: Jan. 28, 2020

(54) INFORMATION PROCESSING DEVICE, PROGRAM, AND INFORMATION PROCESSING SYSTEM

(71) Applicant: SONY CORPORATION, Tokyo (JP)

(72) Inventors: Junji Oi, Kanagawa (JP); Takehisa Souraku, Shizuoka (JP); Hiroki Gohara, Tokyo (JP); Tetsuhiro Uchida, Kanagawa (JP); Satoshi Asai, Saitama (JP); Emika Arai, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/091,841

(22) PCT Filed: May 2, 2017

(86) PCT No.: PCT/JP2017/017279
§ 371 (c)(1),
(2) Date: Oct. 5, 2018

(87) PCT Pub. No.: WO2017/199769
PCT Pub. Date: Nov. 23, 2017

(65) Prior Publication Data
US 2019/0087989 A1    Mar. 21, 2019

(30) Foreign Application Priority Data

May 19, 2016  (JP) .................................. 2016-100166

(51) Int. Cl.
*G06T 11/20* (2006.01)
*A63B 69/38* (2006.01)
(Continued)

(52) U.S. Cl.
CPC ............ *G06T 11/206* (2013.01); *A63B 69/38* (2013.01); *A63B 71/0622* (2013.01);
(Continued)

(58) Field of Classification Search
CPC ..................................................... G06T 11/206
See application file for complete search history.

(56) References Cited

U.S. PATENT DOCUMENTS 7,804,498 B1 *  9/2010  Graham ................ G06T 11/206
                                                    345/419
7,924,283 B1 *  4/2011  Hao ....................... G06T 11/206
                                                    345/428
(Continued)

FOREIGN PATENT DOCUMENTS

JP    H05-224657 A    9/1993
JP    H07-105391 A    4/1995
(Continued)

*Primary Examiner* — Phi Hoang
(74) *Attorney, Agent, or Firm* — Paratus Law Group, PLLC

(57) ABSTRACT

The present technology relates to an information processing device, a program, and an information processing system capable of displaying enormous data so as to be easily understood. The information processing device is provided with a data obtaining unit which obtains a predetermined number of data, and an output unit which outputs image control data which controls to display a particle stereoscopic image in which particles corresponding to the data are stereoscopically distributed with a particle size determined according to the number of data of the obtained data. The present technology is applicable to, for example, the information processing device which displays data and the like.

12 Claims, 19 Drawing Sheets

(51) Int. Cl.
*G06T 19/00* (2011.01)
*A63B 71/06* (2006.01)
*A63B 102/02* (2015.01)
*A63B 102/16* (2015.01)
*A63B 102/18* (2015.01)
*A63B 102/32* (2015.01)

(52) U.S. Cl.
CPC .......... *G06T 19/00* (2013.01); *A63B 2102/02* (2015.10); *A63B 2102/16* (2015.10); *A63B 2102/18* (2015.10); *A63B 2102/32* (2015.10); *A63B 2220/12* (2013.01); *A63B 2220/18* (2013.01); *A63B 2220/35* (2013.01); *A63B 2220/40* (2013.01); *A63B 2220/53* (2013.01); *A63B 2220/62* (2013.01); *A63B 2220/803* (2013.01); *A63B 2220/833* (2013.01); *A63B 2225/50* (2013.01); *G06T 2200/24* (2013.01); *G06T 2210/56* (2013.01)

(56) References Cited

U.S. PATENT DOCUMENTS

| | | | |
|---|---|---|---|
| 2003/0156124 A1* | 8/2003 | Good | G06F 3/0481 345/620 |
| 2012/0317509 A1 | 12/2012 | Ludwig et al. | |
| 2014/0112564 A1* | 4/2014 | Hsiao | G01R 33/5608 382/131 |
| 2015/0317448 A1* | 11/2015 | Razavi | G16H 50/50 702/19 |
| 2016/0070983 A1* | 3/2016 | Watts | G06F 16/29 382/201 |
| 2016/0119615 A1* | 4/2016 | Chang | G06T 19/00 348/51 |

FOREIGN PATENT DOCUMENTS

| | | |
|---|---|---|
| JP | 2014-183931 A | 10/2014 |
| WO | WO 2013/069447 A1 | 5/2013 |

\* cited by examiner

INFORMATION PROCESSING DEVICE, PROGRAM, AND INFORMATION PROCESSING SYSTEM

CROSS REFERENCE TO PRIOR APPLICATION

This application is a National Stage Patent Application of PCT International Patent Application No. PCT/JP2017/017279 (filed on May 2, 2017) under 35 U.S.C. § 371, which claims priority to Japanese Patent Application No. 2016-100166 (filed on May 19, 2016), which are all hereby incorporated by reference in their entirety.

TECHNICAL FIELD

The present technology relates to an information processing device, a program, and an information processing system, and especially relates to an information processing device, a program, and an information processing system capable of displaying enormous data so as to be easily understood.

BACKGROUND ART

The present applicant proposes a system including a sensor device and an analysis device for analyzing a hitting position, a swing speed, a ball speed and the like when a ball is hit, for example, attached to a hitting tool such as a tennis racket (for example, refer to Patent Document 1).

CITATION LIST

Patent Document

Patent Document 1: international Publication No. 2013/069447

SUMMARY OF THE INVENTION

Problems to be Solved by the Invention

In the system as described above, the number of data of even one user is large, and if the data of other users are also gathered, the number of data becomes enormous, so that a display method of the data easy for the user is desired.

The present technology is achieved in view of such a situation, and an object thereof is to make it possible to display enormous data so as to be easily understood.

Solutions to Problems

An information processing device according to a first aspect of the present technology is provided with a data obtaining unit which obtains a predetermined number of data, and an output unit which outputs first image control data for controlling to display a particle stereoscopic image in which particles corresponding to the data are stereoscopically distributed with a particle size determined according to the number of data of the obtained data.

A program according to a first aspect of the present technology allows a computer to serve as a data obtaining unit which obtains a predetermined number of data, and an output unit which outputs image control data for controlling to display a particle stereoscopic image in which particles corresponding to the data are stereoscopically distributed with a particle size determined according to the number of data of the obtained data.

An information processing system according to a second aspect of the present technology is provided with a first information processing device, and a second information processing device, the first information processing device storing a predetermined number of data and transmitting to the second information processing device, and the second information processing device provided with a data obtaining unit which obtains the predetermined number of data, and an output unit which outputs image control data for controlling to display a particle stereoscopic image in which particles corresponding to the data are stereoscopically distributed with a particle size determined according to the number of data of the obtained data.

In the first and second aspects of the present technology, a predetermined number of data are obtained, and image control data for controlling to display a particle stereoscopic image in which particles corresponding to the data are stereoscopically distributed with a particle size determined according to the number of data of the obtained data is output.

Meanwhile, the program may be provided by being transmitted through a transmitting medium or being recorded in a recording medium.

The image processing device may be an independent device or may be an internal block which forms one device.

Effects of the Invention

According to one aspect of the present technology, it is possible to display enormous data so as to be easily understood.

Meanwhile, the effects herein described are not necessarily limited and may be any of the effects described in the present disclosure.

MODE FOR CARRYING OUT THE INVENTION

A mode for carrying out the present technology (hereinafter, referred to as an embodiment) is hereinafter described. Meanwhile, the description is given in the following order.
1. System Configuration Example
2. Functional Block Diagram
3. Processed image Example (1)
4. Processed image Example (2)
5. Particle Size Determination Processing Flow
6. Processed Image Example (3)
7. Data Selection Display Change Processing Flow
8. Another Example of Particle Stereoscopic Image
9. Hardware Configuration <1. System Configuration Example>

Figure 1:
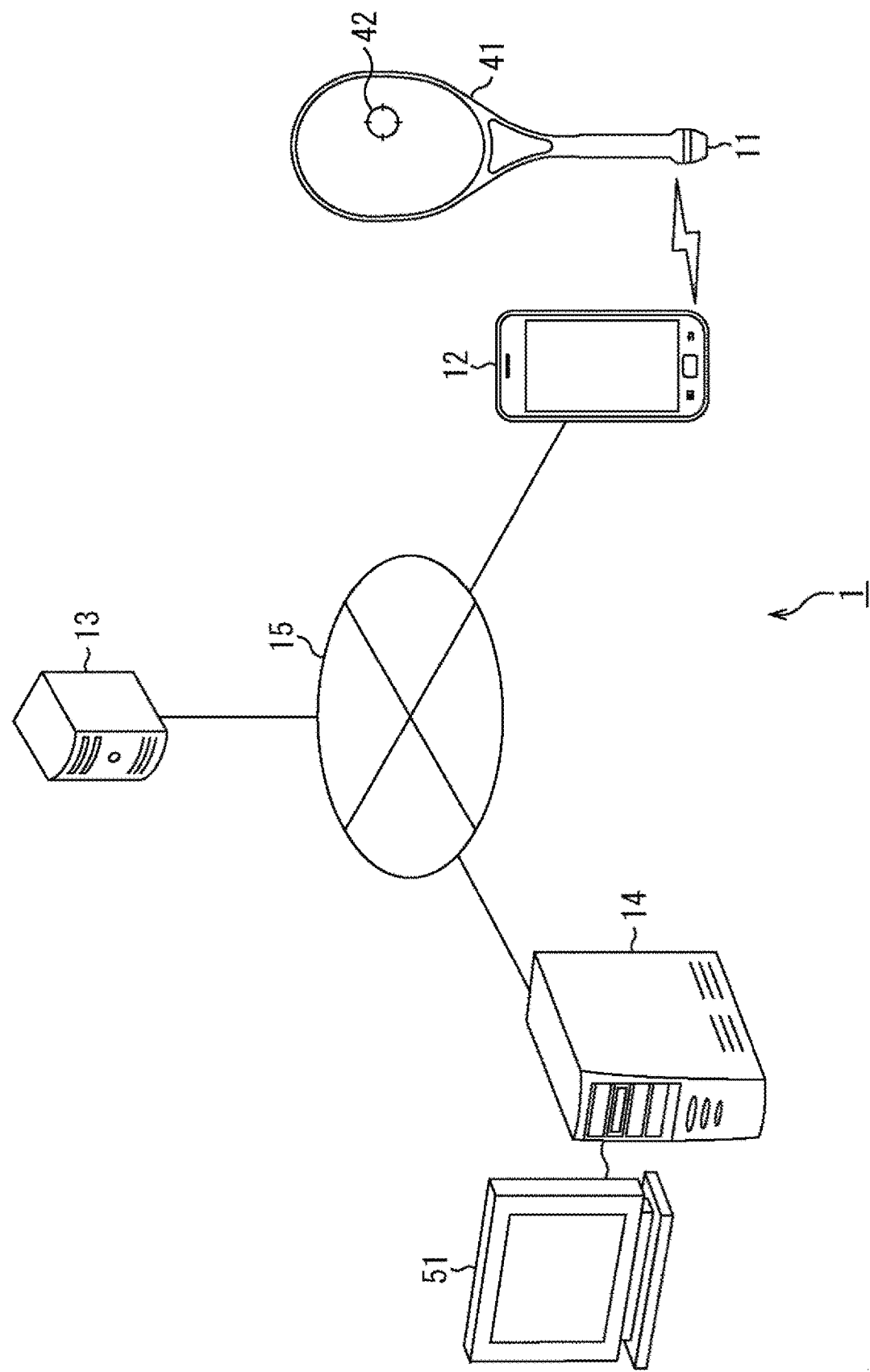
FIG. 1 is a view illustrating a configuration example of a first embodiment of an information processing system to which the present technology is applied.

FIG. 1 illustrates a configuration example of one embodiment of an information processing system to which the present technology is applied.

An information processing system 1 FIG. 1 is a system which includes a sensor device 11, a smartphone 12, a server 13, and a personal computer (PC) 14 and performs predetermined data processing using a sensor signal output by the sensor device 11. The smartphone 12, the server 13, and the PC 14 are connected to one another via a network 15 such as the Internet, a telephone network, a satellite communication network, a local area network (LAN), a wide area network (WAN), for example.

The sensor device 11 is attached to a predetermined portion (for example, a grip end) of a racket 41 and outputs the sensor signal capable of calculating shot data when a user hits a ball 42 using the racket 41 (hereinafter also referred to as shot data) to the smartphone 12.

The sensor device 11 is provided with, for example, a vibration sensor, and outputs the sensor signal indicating vibration (impact) when the user hits the ball 42 using the racket 41 to the smartphone 12. Also, the sensor device 11 is provided with, for example, an acceleration sensor, an angular speed sensor, a geomagnetic sensor and the like (for example, a nine-axis motion sensor) and the like and outputs the sensor signal indicating acceleration, an angular speed, inclination and the like of the racket when the user hits the ball 42 using the racket 41 to the smartphone 12.

Meanwhile, the sensor signal and a control signal exchanged between the sensor device 11 and the smartphone 12 are transmitted using near field communication such as Bluetooth (registered trademark) and wireless local area network (LAN), for example.

The smartphone 12 receives the sensor signal transmitted from the sensor device 11 using the near field communication and stores the same in an internal memory. In addition, the smartphone 12 analyzes the received sensor signal, thereby converting the same into the shot data indicating information of a shot when the user hits the ball 42 using the racket 41. Then, the smartphone 12 transmits the converted shot data of the user to the server 13 via the network 15 together with user information.

Meanwhile, the smartphone 12 is an example of a device which performs processing of obtaining the sensor signal transmitted from the sensor device 11, converting the same into the shot, data, and transmitting the same to the server 13. Not only the smartphone 12 but also an information processing device such as a tablet terminal and a PC may perform processing similar to that of the smartphone 12 according to this embodiment.

Figure 2:
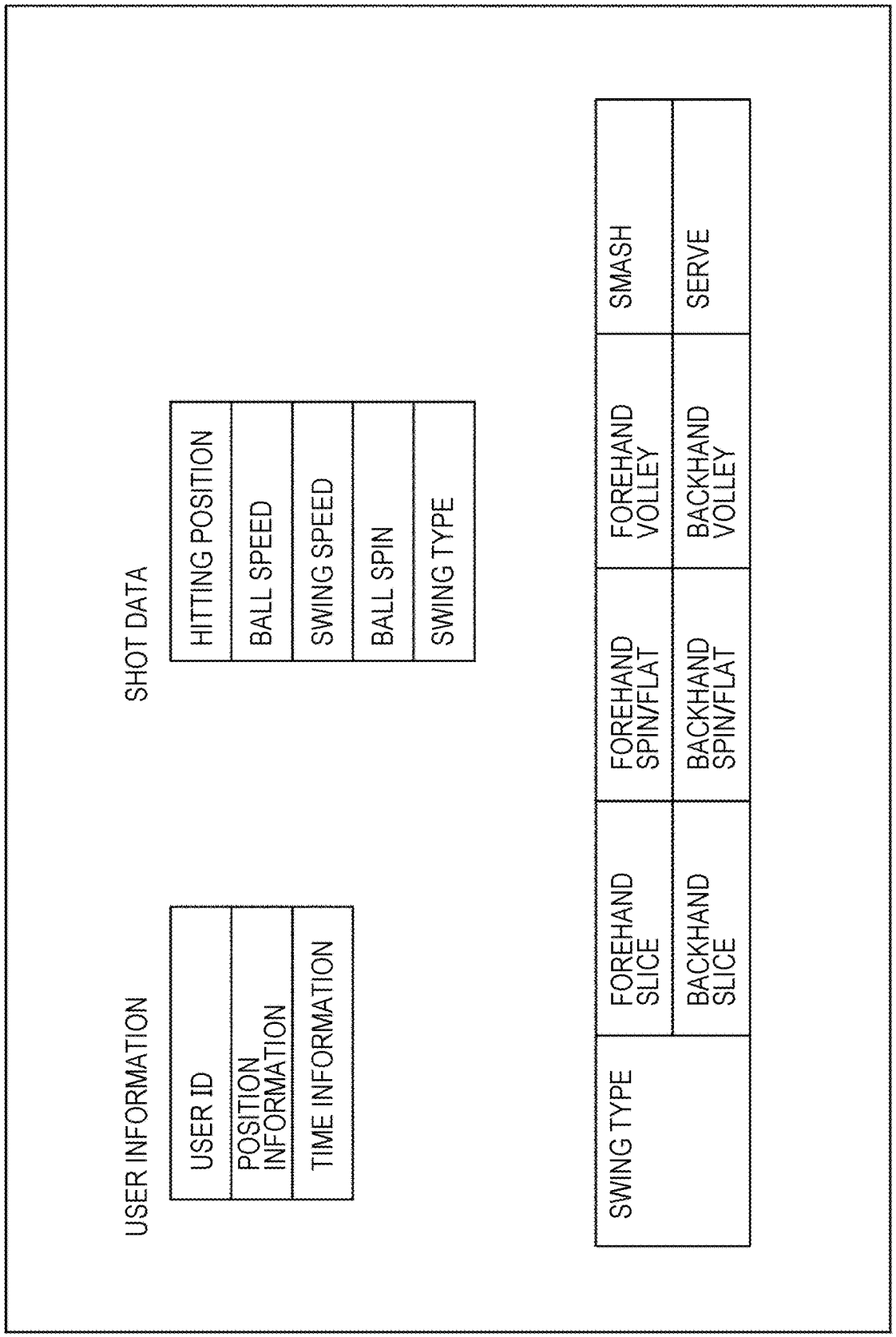
FIG. 2 is a view for illustrating user information and shot data.

FIG. 2 illustrates the user information and the shot data transmitted from the smartphone 12 to the server 13 in detail.

The user information includes a user ID for identifying the user who plays tennis, position information indicating a location of the user, and time information indicating current date and time. The user information may be added for each shot data or may be added for each series of shot data including a plurality of shot data. The position information is obtained from, for example, a global positioning system (GPS) receiver included in the smartphone 12. The time information is obtained from, for example, a clock included in the smartphone 12. Meanwhile, it is also possible that the sensor device 11 itself is provided with the GPS receiver and the clock, and the position information and the time information are obtained from the sensor device 11.

The shot data includes a hitting position, a ball speed, a swing speed, a ball spin, and a swing type. The shot, data is generated in shot (ball hit) unit.

The hitting position indicates a hitting (contact) position of the ball 42 when the ball 42 is hit by the racket 41. The hitting position is indicated by, for example, an area number of an area obtained by dividing a face surface of the racket 41 into a grid pattern.

The ball speed is a speed (initial speed) of the ball 42 when the ball 42 is hit by the racket 41 and is expressed in km/h or mph.

The swing speed is a speed of the racket 41 when the ball 42 is hit by the racket 41 and is expressed in km/h or mph.

The ball spin is an amount of rotation of the ball 42 generated when the ball 42 is hit by the racket 41 and is expressed by an integer value of 21 steps from −10 to +10.

The swing type is a type of swing when the ball 42 is hit by the racket 41; it is discriminated as any one of a forehand slice, a forehand spin/flat, a forehand volley, a back hand slice, a back hand spin/flat, a back hand volley, a smash, and a serve as illustrated in FIG. 2.

Each item of the shot data may be discriminated by extracting a statistical feature amount such as a frequency characteristic, an average, a variance, a minimum value, and a maximum value from time series data of various sensor signals transmitted from the sensor device 11 and comparing the same with a feature value of each item prepared in advance, for example. Alternatively, for discriminating each item of the shot data, a non-rule based method of forming a discriminating parameter from data by machine learning such as a neural network, a support vector machine (SVM), a k nearest neighbor discriminator, and Bayesian classification, for example, may also be used.

With reference to FIG. 1 again, the server 13 stores the user information and the shot data transmitted from the smartphone 12 of each user who is a user of the information processing system 1 in an internal database. The position information indicating the location of the user is converted into country information to be stored in the database. Then, in response to a request from the PC 14, the server 13 transmits the user information and the shot data of each user stored in the database to the PC 14.

Meanwhile, although it is assumed that the smartphone 12 performs processing of discriminating the shot data from the sensor signal and transmits the user information and the shot data to the server 13 as described above in this embodiment, it is also possible that the sensor signal output from the sensor device 11 is directly transmitted to the server 13 via the smartphone 12 and the server 13 performs the processing of discriminating the shot data and stores the same in the database. That is, the processing of discriminating the shot data from the sensor signal may be performed by either the smartphone 12 or the server 13.

The PC 14 executes shot data display control processing of accessing the server 13 via the network 15, obtaining the user information and the shot data of a large number of users accumulated in the database of the server 13, and generating a processed image in which the obtained enormous shot data of a large number of users are visualized so as to be visually easily understood. The PC 14 outputs image control data of the processed image generated by the shot data display control processing to a display 51 and allows the display 51 to display the processed image.

Meanwhile, the PC 14 is an example of a device which performs the shot data display control processing of obtaining and visualizing the data accumulated in the server 13. An information processing device such as a smartphone and a tablet terminal may also perform the processing similar to that of the PC 14 in place of the PC 14.

In the information processing system 1 configured as described above, the shot data of the users of the countries around the world are collected in the server 13 to be accumulated in the database. The user who is the player who attaches the sensor device 11 to the racket 41 and plays tennis operates the PC 14. The PC 14 executes the shot data display control processing according to operation of the user. By this shot data display control processing, the shot data of a large number of users accumulated in the server 13 are obtained and the processed image is generated to be displayed on the display 51. The user may look at the processed image displayed on the display 51 and compare the same with the user's own shot data stored in the smartphone 12, for example.

In the following, the shot data display control processing of obtaining the user information and the shot data of a large number of users accumulated in the database of the server 13, visualizing the same so as to be visually easily understood, and presenting the same to the user performed by the PC 14 is described in detail.

<2. Functional Block Diagram>

Figure 3:
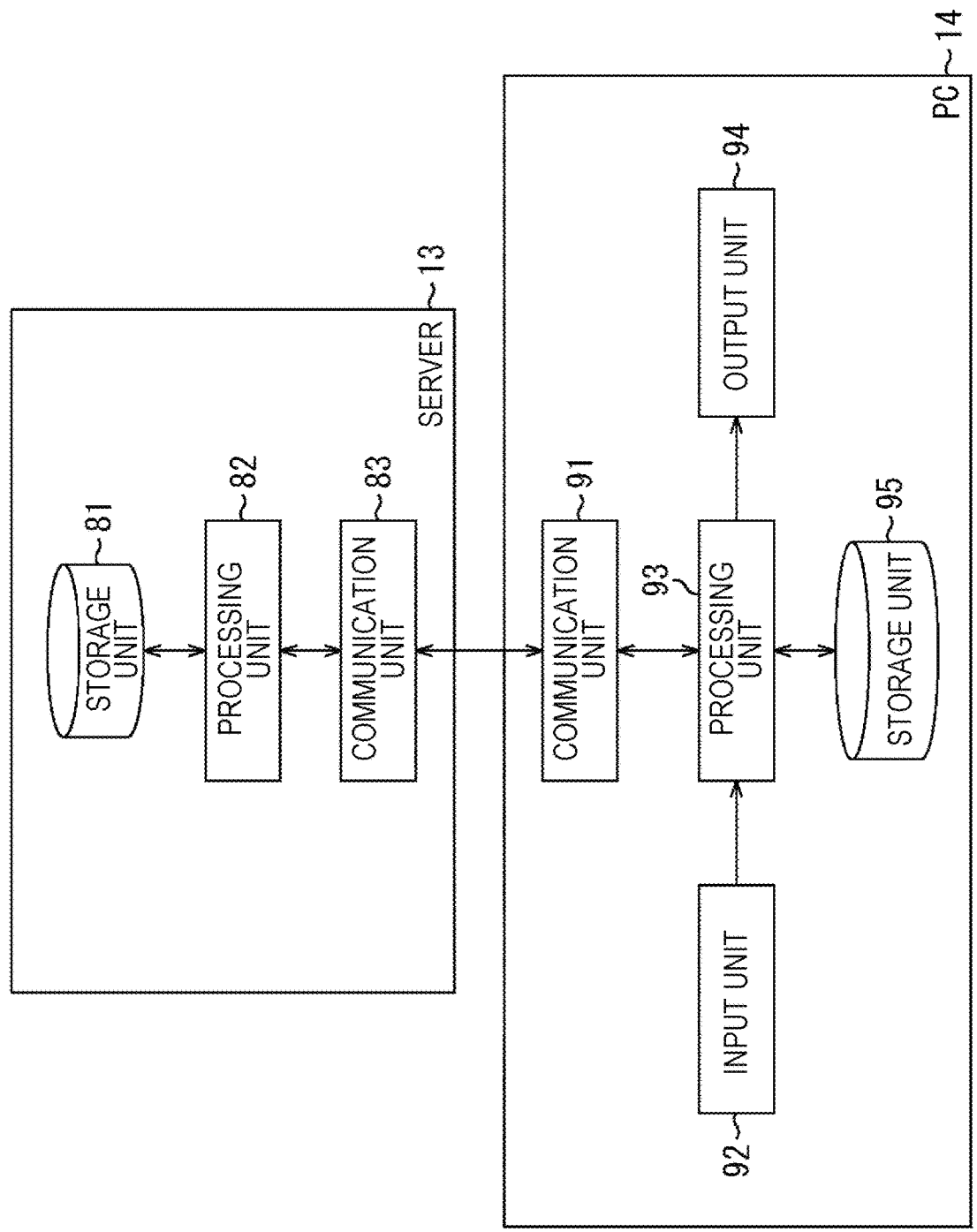
FIG. 3 is a functional block diagram of a server and a PC.

FIG. 3 illustrates a functional block diagram of the server 13 and the PC 14 regarding the shot data display control processing.

The server 13 includes at least a storage unit 81, a processing unit 82, and a communication unit 83.

The storage unit 81 includes a database including a hard disk drive (HDD), a semiconductor memory and the like, and stores the user information and the shot data transmitted from the smartphone 12 of each user, for example. As described above, the position information transmitted from the smartphone 12 is converted into the country information and stored in the database. Meanwhile, in the following description, the user information and the shot data are collectively referred to as play data, and each item of the user information and the shot data forming the play data is also referred to as a data attribute.

A program which controls operation of an entire server 13, user registration information of the user who accesses the server 13, and the like are also stored in the storage unit 81. The user registration information includes, for example, a user registration ID and a password used when accessing the server 13, sex, age, country information and the like. The user registration ID and the user ID may be the same.

The processing unit 82 executes processing of allowing the database of the storage unit 81 to store the play data of each user transmitted from the smartphone 12. Also, in response to the request from the PC 14, the processing unit 82 executes processing of transmitting the play data stored in the database to the PC 14. The processing unit 82 includes a processor such as a central processing unit (CPU), for example.

The communication unit 83 receives a command and data transmitted from the smartphone 12 and the PC 14 and supplies them to the processing unit 82. Also, the communication unit 83 transmits the command and data supplied from the processing unit 82 to the smartphone 12 and the PC 14.

The communication unit 83 is a communication interface including a communication device and the like for connecting to the wired or wireless network 15. The communication unit 83 may be a wireless local area network (LAN) compliant communication device, a long term evolution (LIE) compliant communication device, or a wire communication device which performs communication by wire.

The PC 14 includes at least a communication unit 91, an input unit 92, a processing unit 93, an output unit 94, and a storage unit 95.

The communication unit 91 receives the command and data transmitted from the server 13 and supplies them to the processing unit 93. Also, the communication unit 91 transmits the command and data supplied from the processing unit 93 to the server 13. The communication unit 91 is a communication interface including a communication device and the like for connecting to the network 15 as is the case with the communication unit 83 of the server 13. The communication unit 91 may also communicate with devices other than the server 13.

The input unit 92 includes, for example, a touch panel provided on a display, an operation button, a controller, a mouse and the like, accepts an operation input by the user, and supplies the same to the processing unit 93. The input unit 92 may also include a microphone for accepting user's voice as the operation input, a camera or a sensor for accessing user's gesture as the operation input, and the like.

The processing unit 93 executes the shot data display control processing. That is, the processing unit 93 requires the server 13 of necessary play data on the basis of the operation of the user supplied from the input unit 92, generates the processed image obtained by processing the play data obtained from the server 13 such that the user may easily understand, and supplies the image control data thereof to the output unit 94.

For example, the processing unit 93 obtains the play data of all the users stored in the server 13 and generates the processed image. For example, the processing unit 93 obtains only a part of the play data such as play data of the user belonging to a certain country and play data of a predetermined date from the server 13 and generates the processed image.

The processing unit 93 includes a processor such as a central processing unit (CPU), for example, and executes predetermined processing such as the shot data display control processing by execution of a program stored in the storage unit 95.

The output unit 94 includes an external output terminal for outputting an image signal to the display 51 as an external display device and the like and outputs the image control data of the processed image generated by the processing unit 93 to the display 51, thereby allowing the display 51 to display the processed image. The output unit 94 also includes a speaker and outputs predetermined sound and music. The output, unit 94 may include a display and the output unit 94 itself may display the processed image.

The storage unit 95 includes, for example, a hard disk drive (HDD), a semiconductor memory and the like, temporarily stores the play data transmitted from the server 13, and stores setting data or the like necessary for generation of the processed image performed by the processing unit 93. The storage unit 95 also stores the program for controlling operation of an entire PC 14 and the like.

<3, Processed Image Example (1)>

Figure 4:
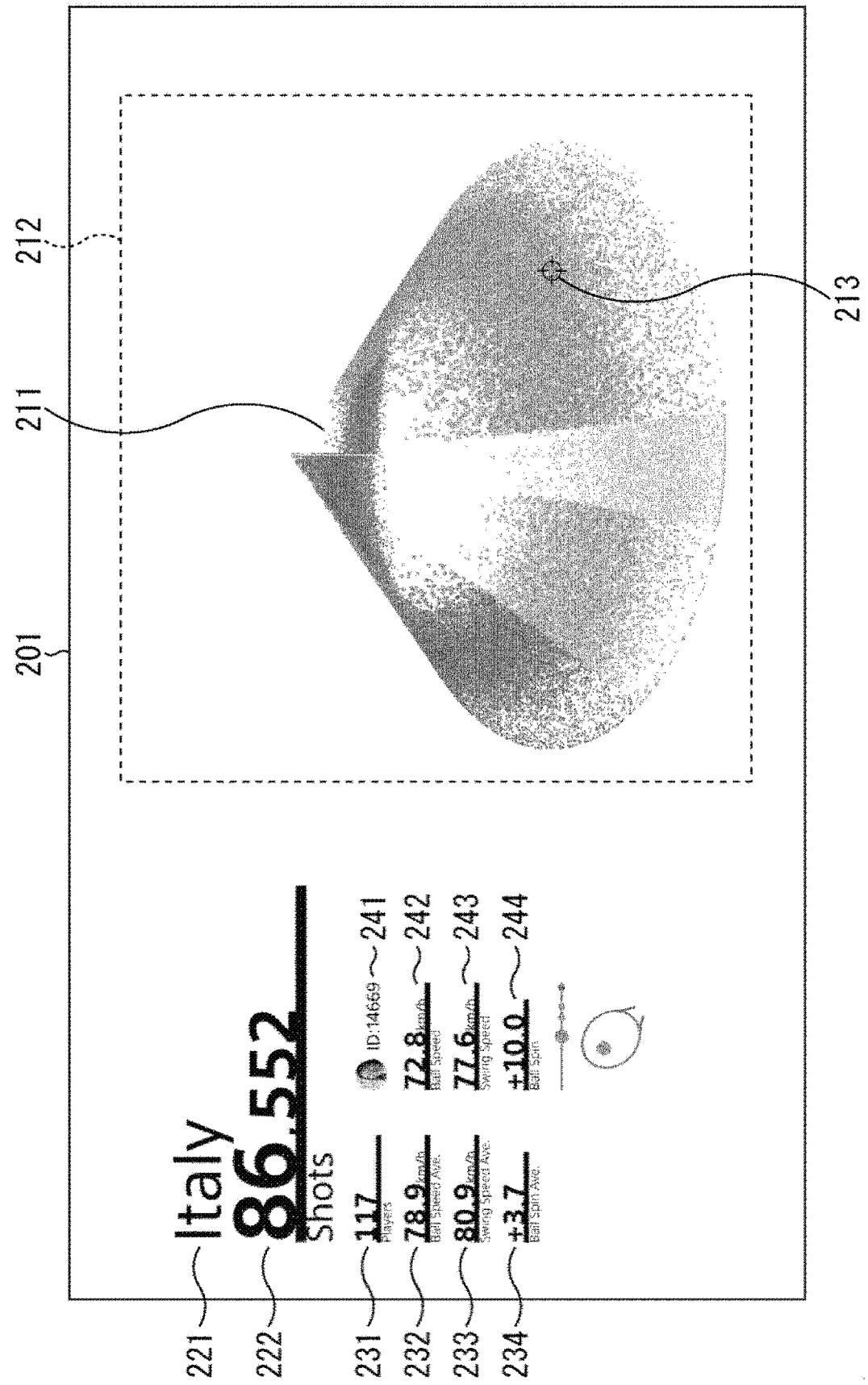
FIG. 4 is a view illustrating an example of a processed image by shot data display control processing.

FIG. 4 illustrates an example of the processed image generated by the shot data display control processing performed by the processing unit 93 and displayed on the display 51.

The processed image 201 illustrated in FIG. 4 is the processed image generated by obtaining only play data of users in Italy out of the play data stored in the server 13.

In a right side area of the processed image 201, a particle display area 212 for displaying a particle stereoscopic image in which respective shot data are stereoscopically represented using particles 211 on the basis of the play data obtained from the server 13 is arranged. The particle 211 represents a granular, a particulate, or a spherical shape. One particle 211 corresponds to the shot, data of one shot, and at least the hitting position, ball speed, swing speed, ball spin, and swing type of one shot are associated with one particle 211. The particle stereoscopic image is described later in detail with reference to FIG. 5.

In the particle display area 212, a cursor 213 used when the user selects a desired particle 211 is also displayed. The cursor 213 moves according to the operation of the user in the input unit 92.

Meanwhile, the particle display area 212 is illustrated for the sake of convenience. For example, an entire area of the processed image may become the particle display area 212 though some of the particles 211 are also distributed outside the particle display area 212 in a processed image 301 in FIG. 16 and a processed image 321 in FIG. 18 to be described later.

In a left side area of the processed image 201, a country name display part 221 for displaying a country name of the displayed play data and a data number display part 222 for displaying the number of displayed shot data are displayed.

"Italy" is displayed in the country name display part 221 of the processed image 201, indicating that the shot data of the processed image 201 are the shot data of the users in Italy.

In the data number display part 222 of the processed image 201, "86552" is displayed, indicating that the number of data of the shot data of the users in Italy is 86552. Since one particle 211 of the particle stereoscopic image corresponds to one shot data, the number of particles 211 displayed in the particle display area 212 is also 86552.

There are two columns under the data number display part 222 in which a player number display part 231, an average ball speed display part 232, an average swing speed display part 233, and an average ball spin display part 234 are arranged in a left column. In a right column, a user ID display part 241, a ball speed display part 242, a swing speed display part 243, and a ball spin display part 244 are arranged.

The number of players of the shot data displayed in the particle display area 212 is displayed in the player number display part 231. That is, the player number display part 231 displays to how many people the shot data displayed in the particle display area 212 belong.

In the average ball speed display part 232, an average value of the ball speeds for all the shot data displayed in the particle display area 212 is displayed. Therefore, in the processed image 201 in FIG. 4, the average value of the ball speeds of all the players in Italy is displayed.

In the average swing speed display part 233, an average value of the swing speeds for all the shot data displayed in the particle display area 212 is displayed. Therefore, in the processed image 201 in FIG. 4, the average value of the swing speeds of all the players in Italy is displayed.

An average value of the ball spins for all the shot data displayed in the particle display area 212 is displayed in the average ball spin display part 234. Therefore, in the processed image 201 in FIG. 4, the average value of the ball spins of all the players in Italy is displayed.

In the user ID display part. 241, the user ID of the particle 211 selected by the cursor 213 in the particle display area 212 is displayed. That is, in the user ID display part 241, person to whom the shot data selected by the cursor 213 belongs is displayed.

In the ball speed display part 242, a value of the ball speed of the particle 211 selected by the cursor 213 in the particle display area 212 is displayed.

In the swing speed display part 243, a value of the swing speed of the particle 211 selected by the cursor 213 in the particle display area 212 is displayed.

In the ball spin display part 244, a value of the ball spin of the particle 211 selected by the cursor 213 in the particle display area 212 is displayed.

Figure 5:
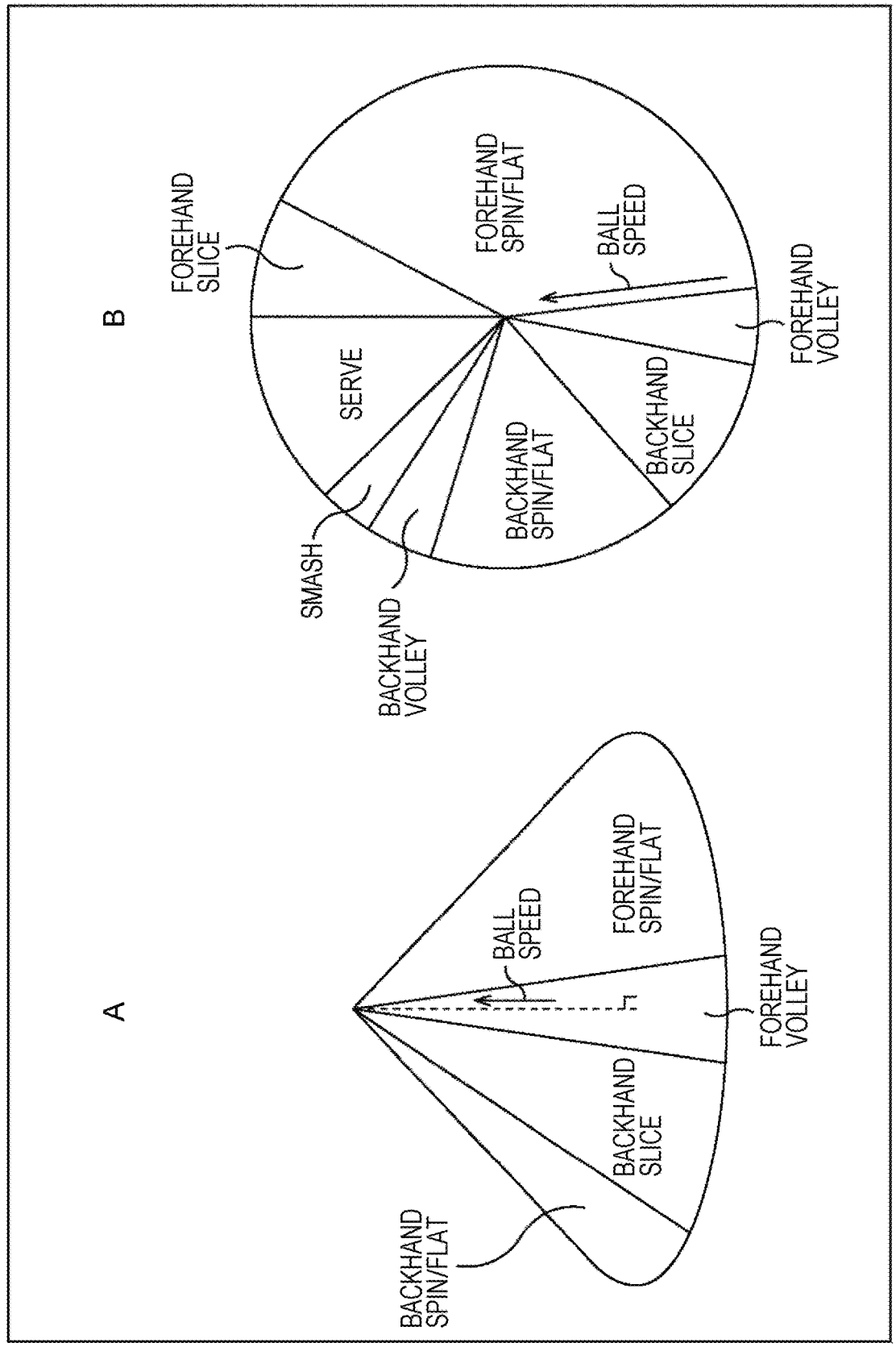
FIG. 5 is a view for illustrating a particle stereoscopic image.

Next, with reference to FIG. 5, the particle stereoscopic image displayed in the particle display area 212 is described.

The processing unit 93 generates the particle stereoscopic image in which the particles 211 corresponding to respective shot data to be displayed are distributed on a side surface of a conical shape and displays the same in the particle display area 212 as illustrated in A of FIG. 5. An axis in a height direction of the conical shape corresponds to the ball speed of each shot data, and it is arranged in a position closer to an apex of the conical shape as the ball speed is faster, and arranged in a position closer to a bottom surface of the conical shape as the ball speed is slower.

B of FIG. 5 is a plan view of the particle stereoscopic image in the conical shape as seen from above.

The swing type of each shot data to be displayed is classified into any one of eight types; the forehand slice, the forehand spin/flat, the forehand volley, the back hand slice, the back hand spin/flat, the back hand volley, the smash, and the serve.

In a case where the particle stereoscopic image in the conical shape is seen from above, the particle stereoscopic image is a pie chart (circular chart) in which the particles 211 are distributed for each swing type to have an area corresponding to a ratio of each swing type with respect to the number of all the data to be displayed.

For example, in a case of color display, the particles 211 are drawn in different colors for each swing type, and in a case of monochrome display (gray display), they are drawn in different gray values for each swing type. This makes it possible to understand the difference in swing type and the ratio of each swing type at a glance. In the example in B of FIG. 5, it may be understood at a glance that the forehand spin/flat data is large.

In addition, since the axis in the height direction of the conical shape corresponds to the ball speed, when seen as the pie chart, the particle 211 is arranged in a position closer to the center of the circle as the ball speed is faster and arranged in a position closer to an outer periphery of the circle as the ball speed is slower. As a result, for example, the tendency of the ball speed for each swing type may be understood at a glance.

<4. Processed Image Example (2)>

Figure 6:
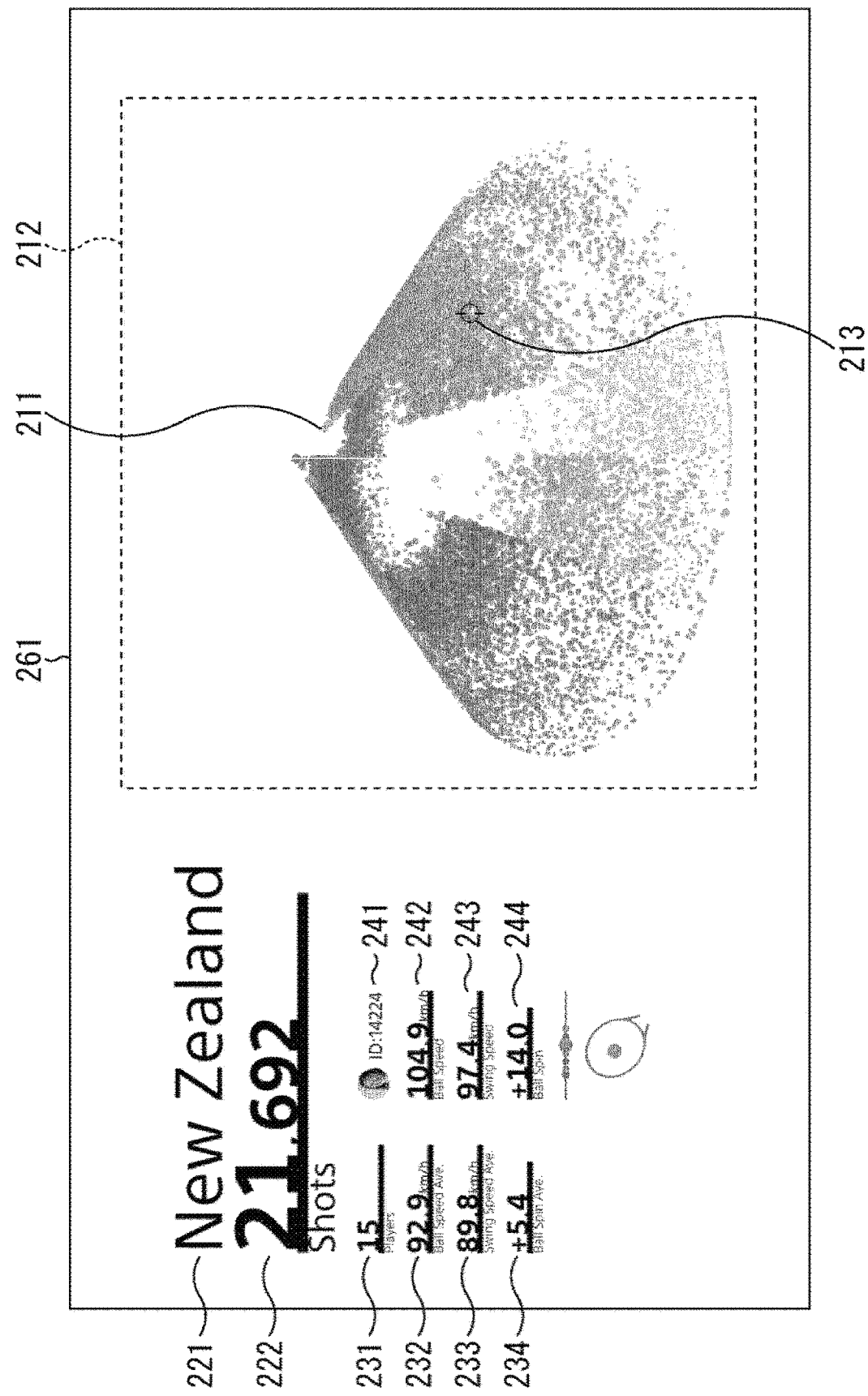
FIG. 6 is a view illustrating an example of the processed image by the shot data display control processing.

FIG. 6 illustrates another example of the processed image generated by the processing unit 93.

A processed image 261 illustrated in FIG. 6 is the processed image generated by obtaining only play data of the users in New Zealand out of the play data stored in the server 13.

Therefore, "New Zealand" is displayed in the country name display part 221, and "21692" which is the number of shot data of the users in New Zealand is displayed in the data number display part 222.

In addition, although not described individually, the value of each of the player number display part 231, the average ball speed display part 232, the average swing speed display part 233, the average ball spin display part 234, the user ID display part 241, the ball speed display part 242, the swing speed display part 243, and the ball spin display part. 244 corresponds to the shot data of the users in New Zealand.

Then, in the particle display area 212, the particle stereoscopic image in which the particles 211 corresponding to 21692 shot data of the users in New Zealand are distributed in the conical shape is displayed.

Herein, the number of shot data of the processed image 261 of New Zealand in FIG. 6 is 21692, which is approximately ¼ of the number of data 86552 of the processed image 201 of Italy illustrated in FIG. 4; however, density of the particles 211 in the particle stereoscopic image displayed in the particle display area 212 is substantially the same in the processed image 261 of New Zealand and the processed image 201 of Italy.

In other words, although the number of shot data of the processed image 261 of New Zealand in FIG. 6 is approximately ¼ of the number of data of Italy illustrated in FIG. 4, the distribution in the particle stereoscopic image in FIG. 6 is not sparser than that in the particle stereoscopic image in FIG. 4, and this gives an impression that similar number of particles 211 are distributed. This is because the processing unit 93 adjusts a size of the particle 211 according to the number of shot data.

Figure 7:
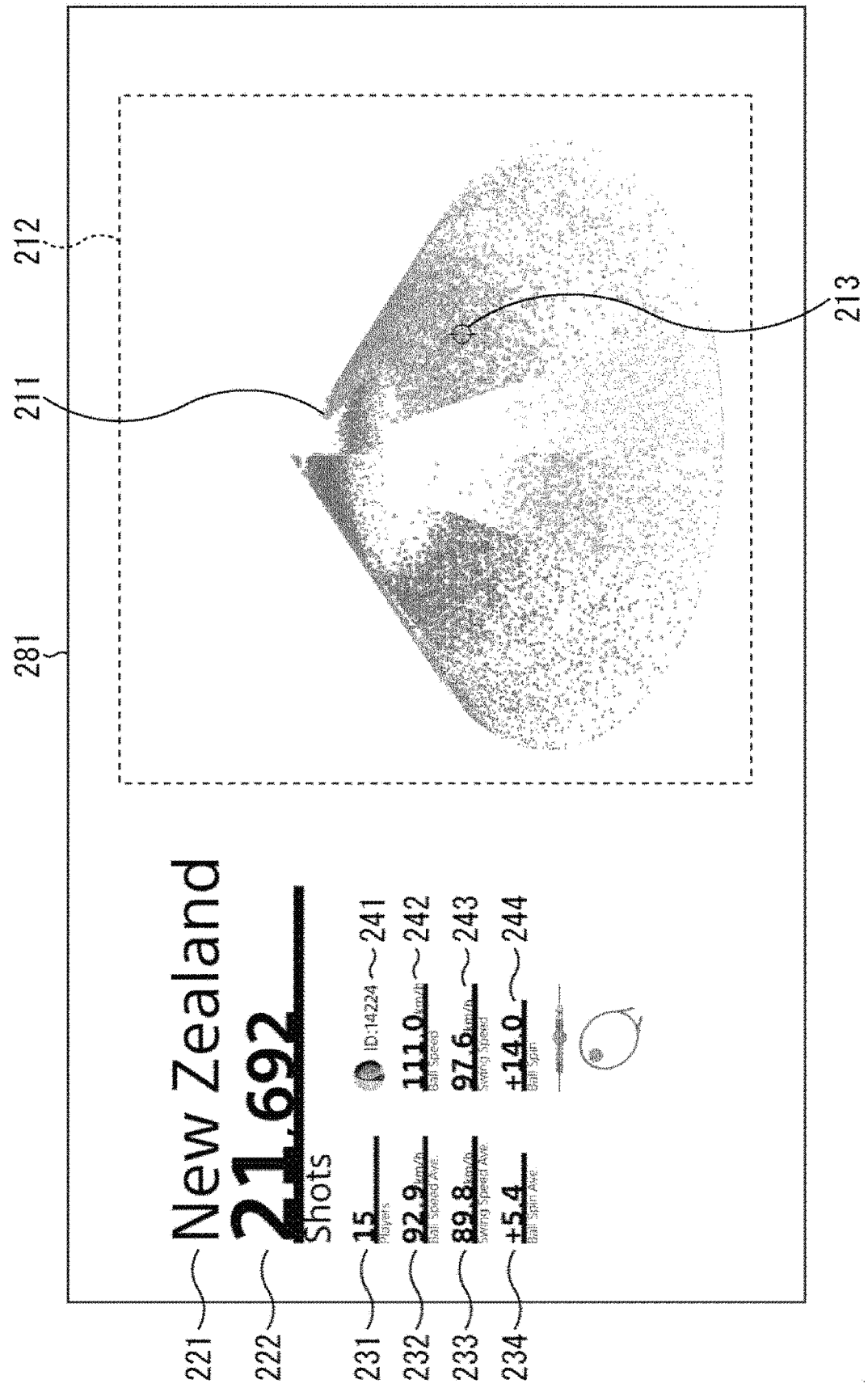
FIG. 7 is a view illustrating an example of a processed image as a comparative example.

FIG. 7 illustrates a processed image 281 of New Zealand in which the particle size of the processed image 261 of New Zealand in FIG. 6 is set to be the same as the particle size of the processed image 201 of Italy illustrated in FIG. 4 as a comparative example.

Comparing the distribution of the particles 211 of the swing type "forehand spin/flat" around the cursor 213 between the processed image 201 in FIG. 4 and the processed image 261 in FIG. 6, the particles are distributed more in an upper part of the side surface of the conical shape in the processed image 261 of New Zealand in FIG. 6, and it is understood that there are more people with a faster ball speed of the swing type "forehand spin/flat" in New Zealand than in Italy in FIG. 4.

On the other hand, comparing the processed image 281 in FIG. 7 with the processed image 201 in FIG. 4 in which the particle size is set to be the same irrespective of the number of data, the density of the particles 211 in the upper part of the side surface of the swing type "forehand spin/flat" in FIG. 7 is approximately the same as the density of the particles 211 in the upper part of the side surface of the swing type "forehand spin/flat" in FIG. 4, so that there is no impression that there are more people with a faster ball speed of the swing type "forehand spin/flat" in New Zealand.

In this manner, by adjusting the particle size according to the number of data of the shot data to be displayed, data comparison becomes easy regardless of the number of data.

<5. Particle Size Determination Processing Flow>

Particle size determination processing by the processing unit 93 is described with reference to a flowchart in FIG. 8.

First, at step S1, the processing unit 93 obtains the shot data to be displayed from the server 13. For example, in a case where the user operates the input unit 92 to display the data of the player in Italy, the processing unit. 93 requires the server 13 of the play data of the player in Italy via the communication unit 91 and obtains the play data (user information and shot data) transmitted from the server 13 in response to the request.

At step S2, the processing unit 93 calculates a particle size Psize of the particle 211 drawn in the particle display area 212 by using following equation (1).

$$P\text{size} = C * L / (\text{number of data})^{1/3} \quad (1)$$

Figure 9:
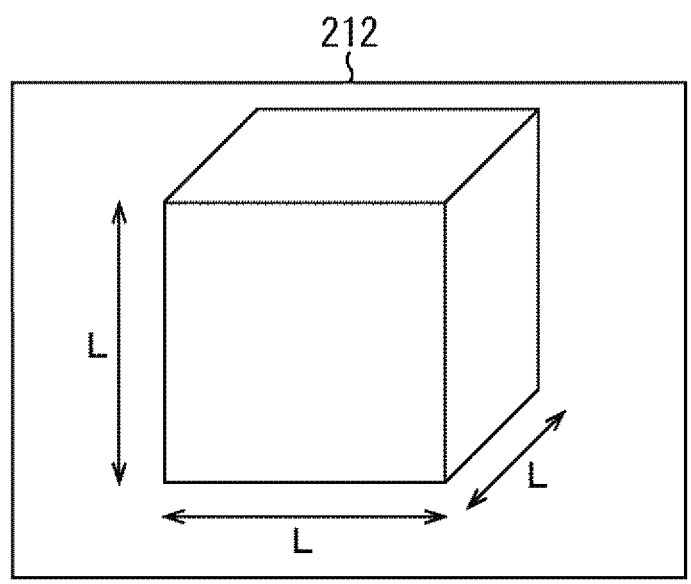
FIG. 9 is a view for illustrating a length which is a parameter for calculating a particle size.

In equation (1), C represents a predetermined constant, and L represents a length of each side of a three-dimensional space which may be displayed in the particle display area 212 as illustrated in FIG. 9. The length L of each side is appropriately determined in accordance with an area size of the particle display area 212, and the constant C serves as an adjustment coefficient for adjusting the particle size Psize and may be appropriately set on a setting screen and the like. The number of shot data obtained from the server 13 is input to the "number of data" in expression (1).

At step S3, the processing unit 93 determines whether the calculated particle size Psize is smaller than a lower limit value PSI determined in advance.

At step S3, in a case where it is determined that the calculated particle size Psize is smaller than the lower limit value PS1 determined in advance, the procedure shifts to step S4, and the processing unit 93 changes the particle size Psize to the lower limit value PS1 and the procedure shifts to step S7.

On the other hand, in a case where it is determined at step S3 that the calculated particle size Psize equal to or larger than the lower limit value PS1 determined in advance, the procedure shifts to step S5, and the processing unit 93 determines whether the calculated particle size Psize is larger than an upper limit value PS2 determined in advance.

At step S5, in a case where it is determined that the calculated particle size Psize is larger than the upper limit value PS2 determined in advance, the procedure shifts to step S6, and the processing unit 93 changes the particle size Psize to the upper limit value PS2 and the procedure shifts to step S7.

On the other hand, in a case where is determined at step S5 that the calculated particle size Psize is equal to or smaller than the upper limit value PS2 determined in advance, the procedure shifts to step S7. As a result, in a case where the calculated particle size Psize is within a range from the lower limit value PS1 to the upper limit value PS2, the particle size Psize calculated at step S2 is adopted as it is. The processing at steps S2 to S6 is performed on all the shot data to be displayed obtained at step S1.

At step S7, the processing unit 93 generates the particle stereoscopic image in which the particles 211 corresponding to the respective shot data to be displayed are distributed in the conical shape with the determined particle size Psize.

As described above, in the particle size determination processing, the particle size Psize is determined according to the number of shot data to be displayed and a space size of the particle display area 212, so that it is possible to display in unified density of the particles 211 regardless of the number of data. As a result, it becomes possible to easily compare even in a case where the number of data to be displayed is significantly different, and enormous data may be displayed so as to be easily understood.

<6. Processed Image Example (3)>

Next, another feature of the processed image displayed by the shot data display control processing of the processing unit 93 is described.

Figure 10:
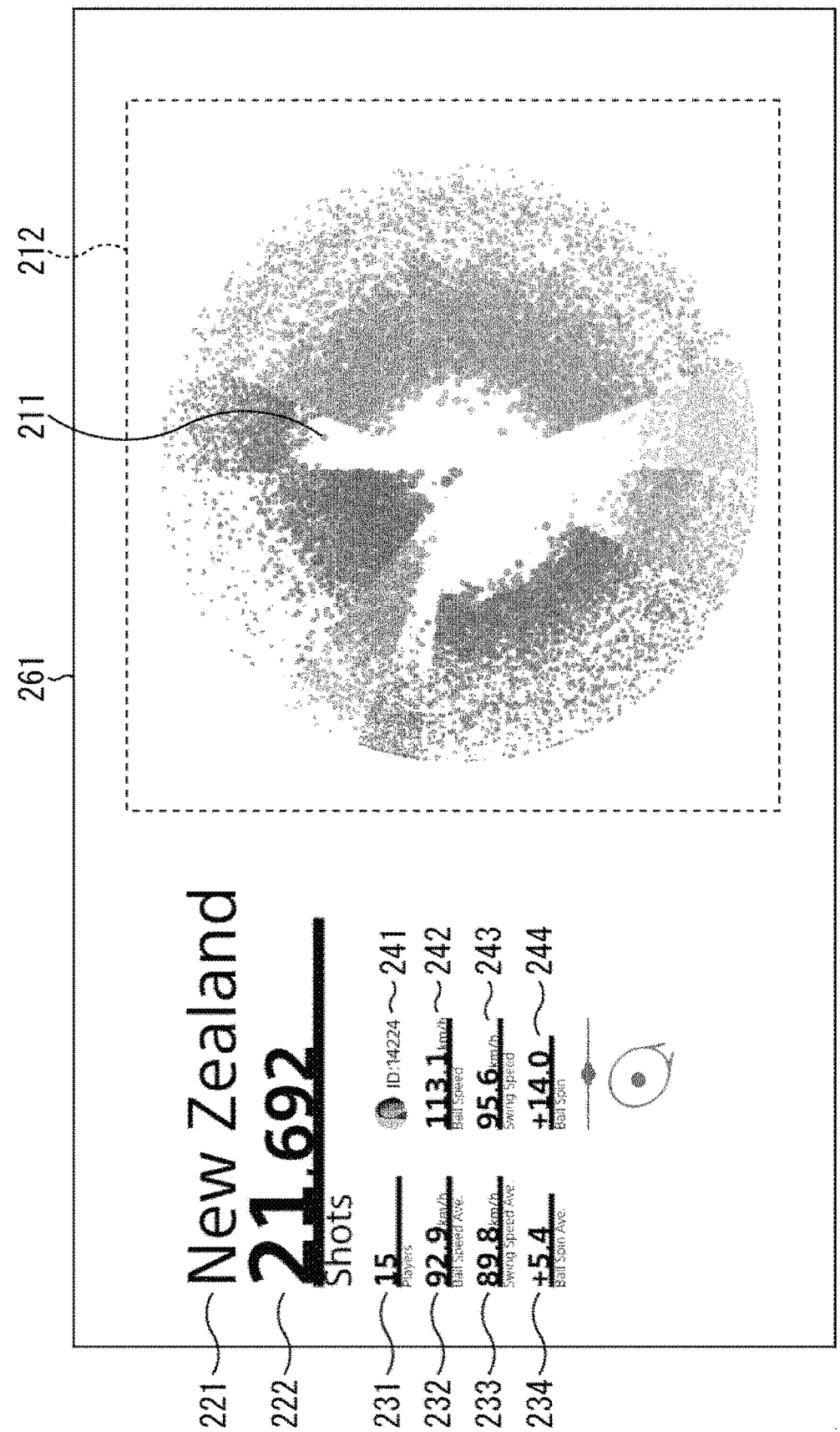
FIG. 10 is a view illustrating an example of the processed image by the shot data display control processing.

FIG. 10 illustrates an example of the processed image generated by the shot data display control processing performed by the processing unit 93 and displayed on the display 51.

The processed image 261 illustrated in FIG. 10 is an image of the particle stereoscopic image in the particle display area 212 of the processed image 261 of New Zealand illustrated in FIG. 6 from another viewpoint as seen from above as illustrated in B of FIG. 5. The user may change the viewpoint of the particle stereoscopic image in the particle display area 212, for example, by operating the mouse or controller of the input unit 92.

The processing unit 93 changes the display of the particle stereoscopic image in the particle display area 212 depending on whether or not the user performs data selection operation of selecting a predetermined particle 211 of the particle stereoscopic image. The data selection operation is defined, for example, by operation of specifying a predetermined particle 211 of the particle stereoscopic image displayed in the particle display area 212 with the cursor 213 and pressing a predetermined operation button.

Figure 8:
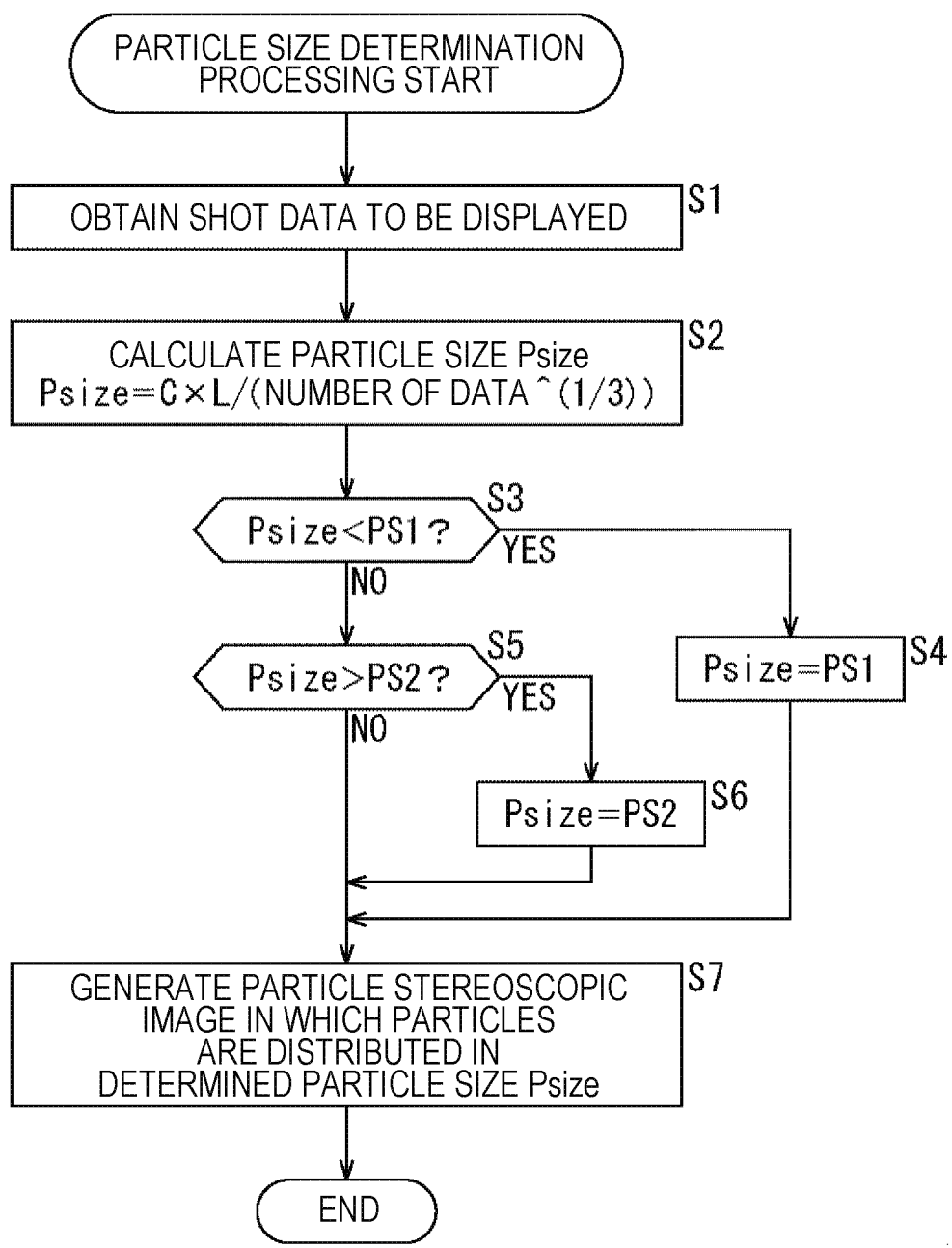
FIG. 8 is a flowchart for illustrating particle size determination processing.
Figure 11:
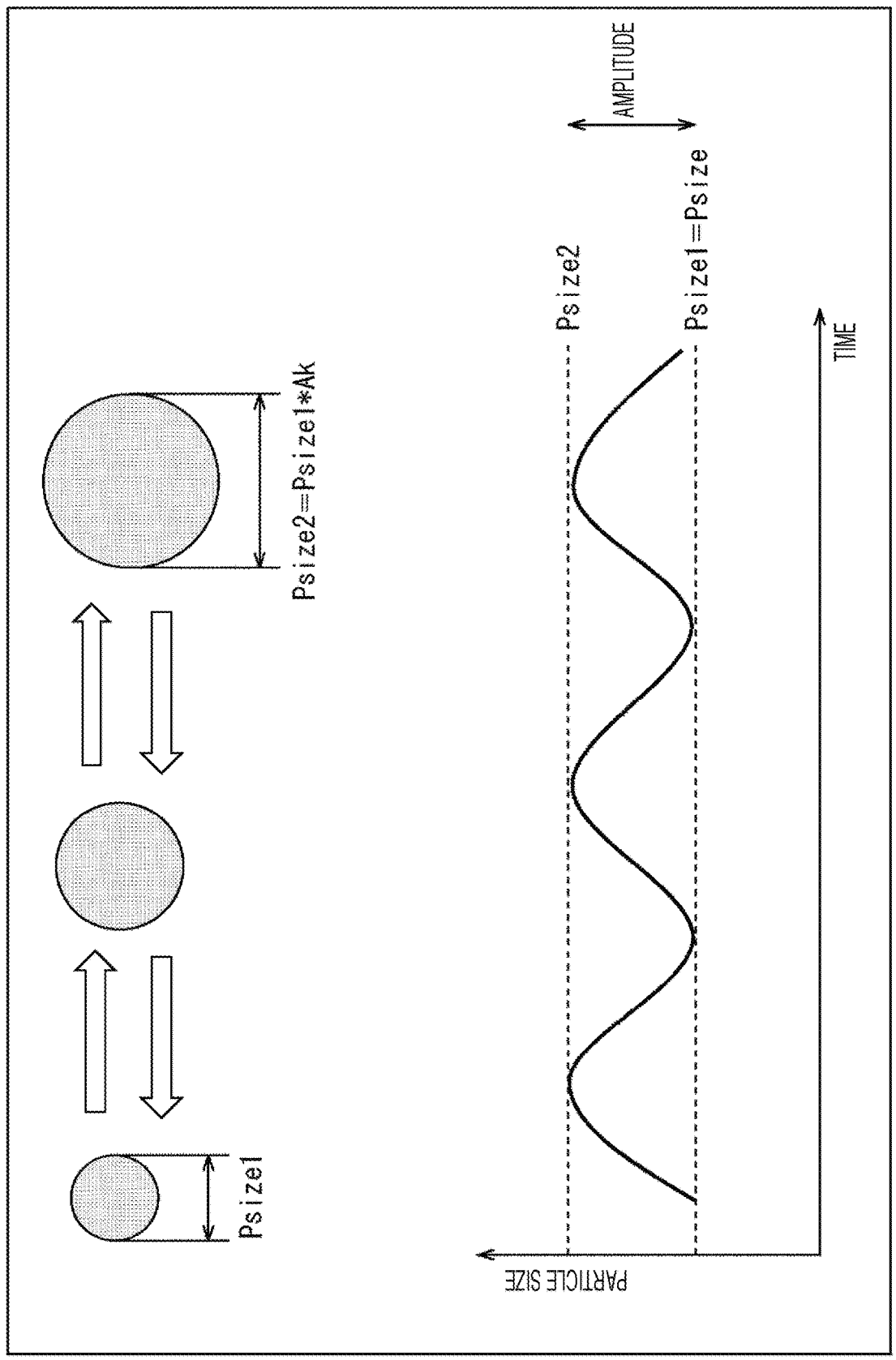
FIG. 11 is a view for illustrating a display when data is not selected.

As illustrated in FIG. 11, assuming that the particle size Psize of each particle 211 determined in the particle size determination processing in FIG. 8 is set to a minimum size Psize1 and a size Ak times (Ak>0) the minimum size psize1 is set to a maximum size psize2, in a case where the user does not perform the data selection operation, the processing unit 93 changes the particle size Psize of each particle 211 according to lapse of time between the minimum size psize1 and the maximum size psize2.

Herein, a magnification coefficient Ak for determining the maximum size psize2 when changing the particle size Psize according to the lapse of time is a value proportional to a value of a predetermined data attribute of the play data.

In this embodiment, the magnification coefficient. Ak for determining the maximum size psize2 is set to a value proportional to the value of the swing speed being one of the predetermined data attributes of the play data. As a result, the processing unit. 93 sets the particle size Psize of each particle 211 determined by the particle size determination processing in FIG. 8 as the minimum size psize1 and changes the particle size Psize such that amplitude (difference between the minimum size Psize1 and the maximum size Psize2) is larger as the value of the swing speed of the particle 211 is larger. Meanwhile, timing of amplitude change of the particle size Psize is different for each particle 211 (the amplitude change of each particle 211 is not synchronized).

On the other hand, in a case where the user performs the data selection operation and a predetermined particle 211 is being selected, the processing unit 93 displays the particle stereoscopic image which emphasizes the particle 211 having the same data attribute as that of the data of the selected particle 211.

Figure 12:
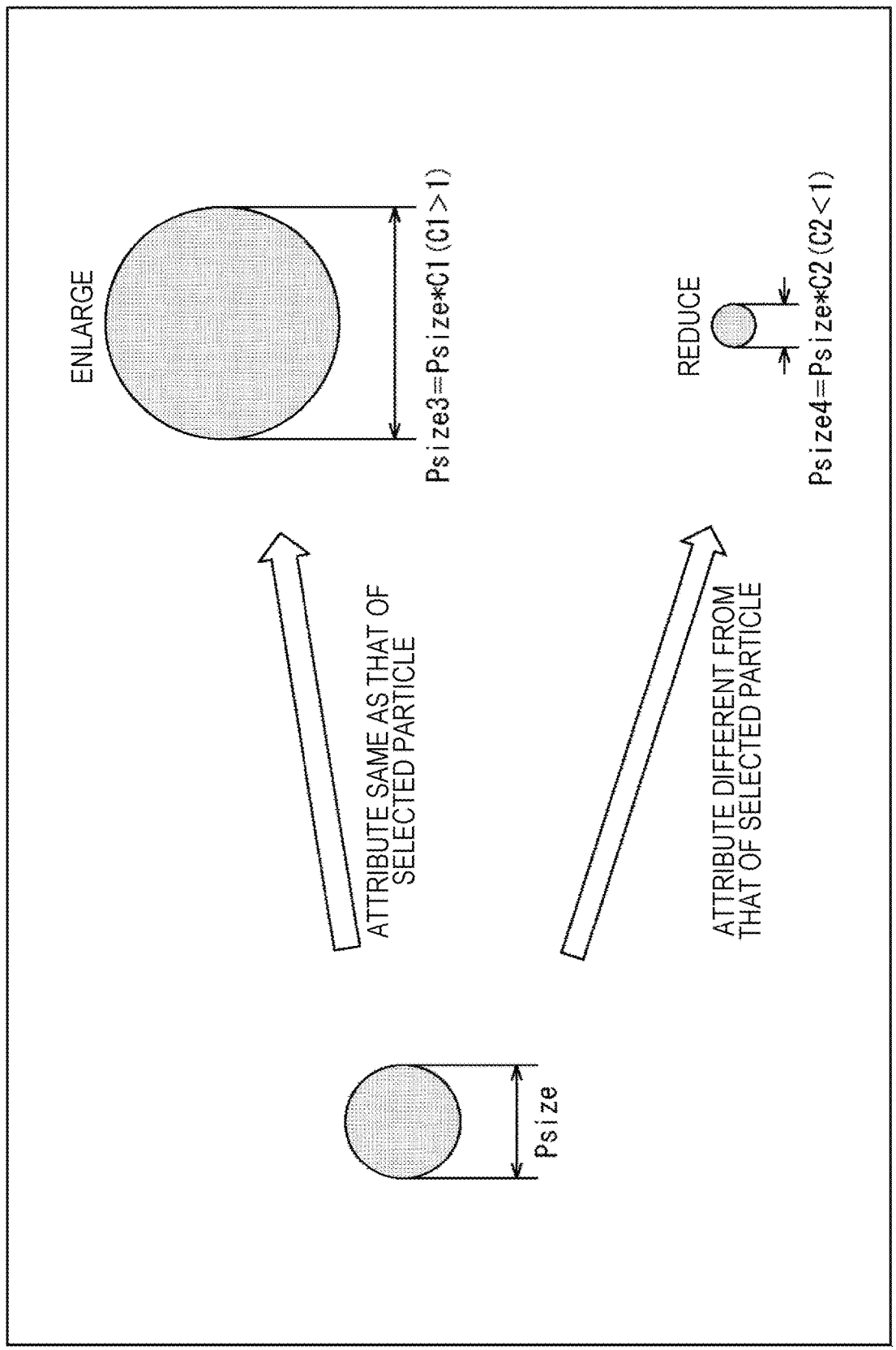
FIG. 12 is a view for illustrating a display when the data is not selected.

Specifically, as illustrated in FIG. 12, the processing unit 93 displays the particle stereoscopic image obtained by multiplying the particle size Psize by C1 (C1>1) for the particle 211 having the same attribute as that of the data selected particle 211 and by multiplying the particle size Psize by C2 (C2<1) for the particle 211 having the attribute different from that of the data selected particle 211.

Figure 13:
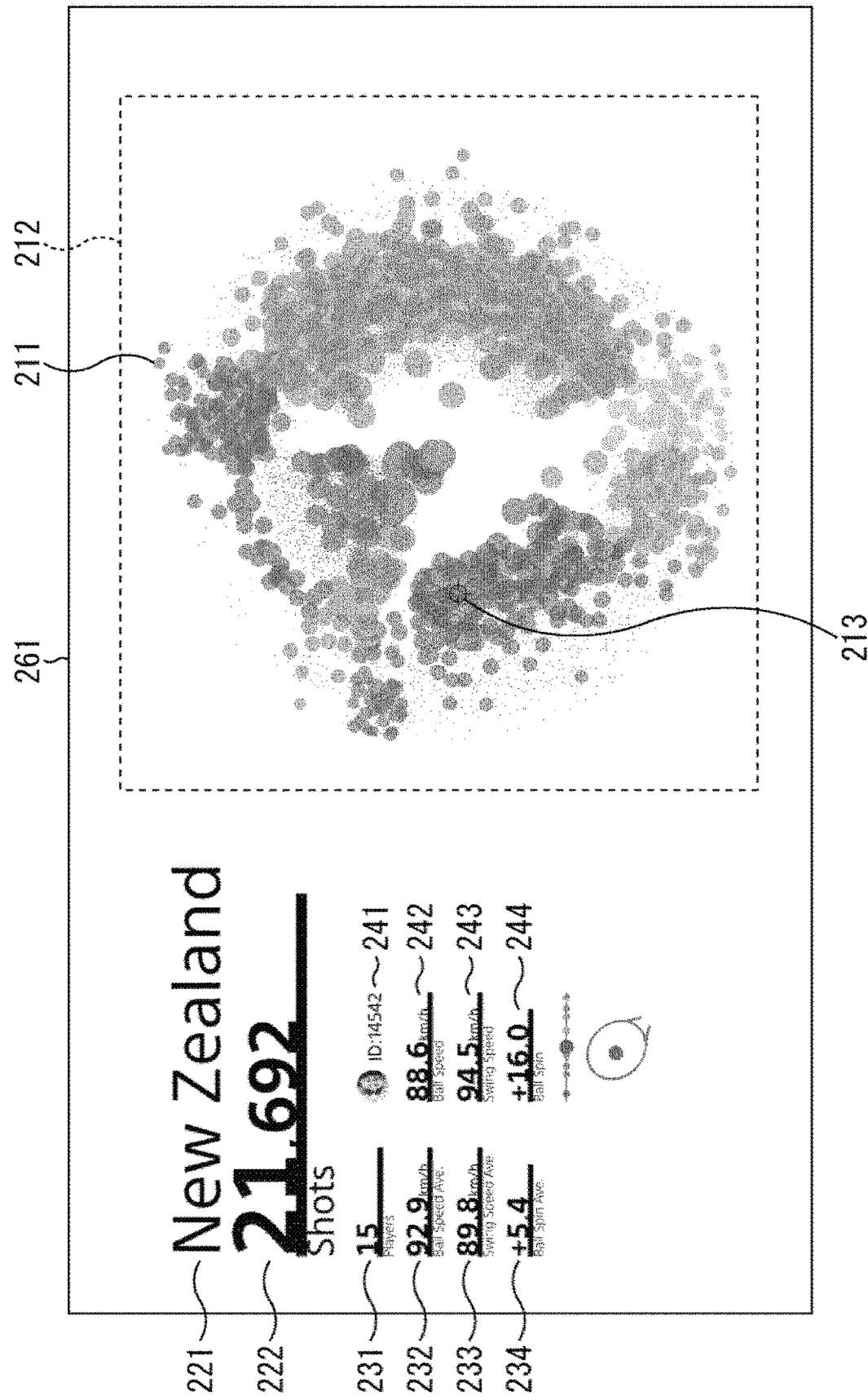
FIG. 13 is a view illustrating an example of a processed image wen the data is selected.

FIG. 13 illustrates the processed image 261 changed during the data selection by the data selection operation performed by the user from a state of the processed image 261 illustrated in FIG. 10.

In this embodiment, the user ID is adopted as the same attribute as that of the data selected particle 211. Therefore, the particle stereoscopic image displayed in the particle display area 212 of the processed image 261 in FIG. 13 is the image obtained by enlarging (multiplying by C1) the particle size Psize as for the particle 211 having the same user ID as the user ID of the data selected particle 211, and by reducing (multiplying by C2) the particle size Psize as for the particle 211 having the user ID different from the user ID of the data selected particle 211. In this manner, by emphasizing the particles 211 having the same data attribute, it is easy for the user to discriminate the data having the same data attribute.

<7. Data Selection Display Change Processing Flow>

Figure 14:
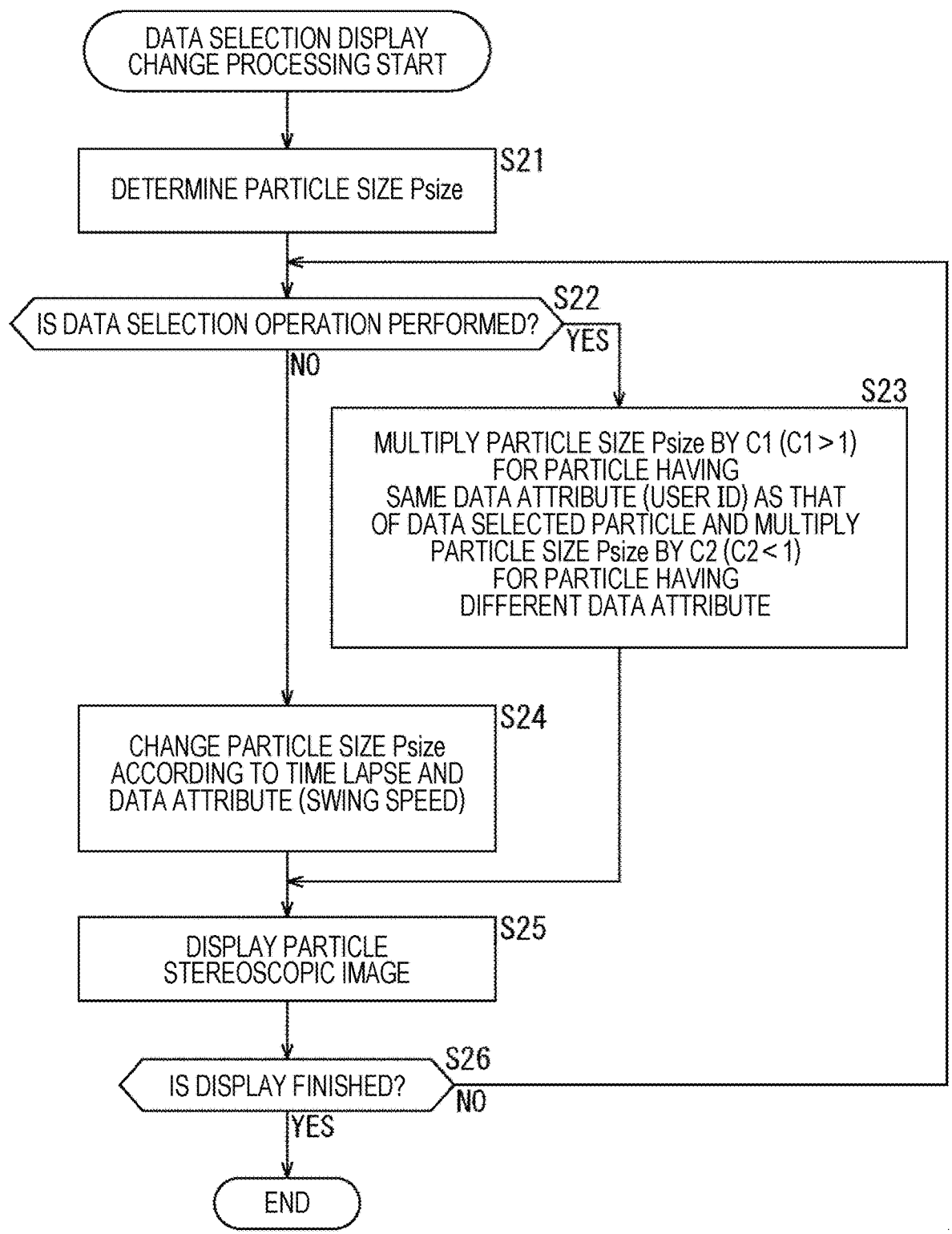
FIG. 14 is a flowchart for illustrating data selection display change processing.

Data selection display change processing by the processing unit 93 is described with reference to a flowchart in FIG. 14.

First, at step S21, the processing unit 93 executes the above-described particle size determination processing in FIG. 8, thereby determining the particle size Psize of the particle 211. Therefore, the particle size determination processing in FIG. 8 is executed as a part of the data selection display change processing.

At step S22, the processing unit 93 determines whether the user performs the data selection operation to specify a predetermined particle 211 of the particle stereoscopic image displayed in the particle display area 212 with the cursor 213 to press the predetermined operation button.

At step S22, in a case where it is determined that the data selection operation is performed, the procedure shifts to step S23, and the processing unit 93 multiples the particle size Psize by C1 (C1>1) as for the particle 211 having the same data attribute (user ID) as that of the data selected particle 211 and multiples the particle size Psize by C2 (C2<1) as for the particle 211 having the data attribute (user ID) different from that of the data selected particle 211 as described with reference to FIG. 12.

On the other hand, in a case where it is determined at step S22 that the data selection operation is not performed, the procedure shifts to step S24, and the processing unit 93 changes the particle size Psize of each particle 211 of the particle stereoscopic image according to the lapse of time as described with reference to FIG. 11. The amplitude of the particle size Psize differs according to the data attribute (swing speed) of the corresponding shot data.

At step S25, the processing unit 93 displays the particle stereoscopic image obtained by drawing each particle 211 in the particle size Psize determined by the processing at step S23 or S24 in the particle display area 212.

At step S26, the processing unit 93 determines whether to finish displaying. For example, in a case where it is detected that the user performs operation to finish the display control processing of displaying the shot data in particle representation and the like, it is determined to finish displaying.

In a case where it is determined that the display is not finished yet at step S26, the procedure returns to step S22 and the above-described processing at steps S22 to S26 is repeated.

On the other hand, in a case where it is determined at step S26 that the display is finished, the data selection display change processing is finished.

As described above, according to the data selection display change processing, the particle stereoscopic image in the particle display area 212 is changed depending on whether or not the data selection operation of specifying the predetermined particle 211 of the particle stereoscopic image displayed in the particle display area 212 by the cursor 213 and pressing the predetermined operation button is performed.

In a case where the user performs the data selection operation, the particle 211 of the same data attribute (user ID) as that of the data selected particle 211 is emphasized. This makes it easy to observe the shot data focusing on the particle 211 having the same data attribute (user ID) as that of the predetermined particle 211.

In a case where the user does not perform the data selection operation, the amplitude of each particle 211 dynamically changes according to the lapse of time and the predetermined data attribute (swing speed). In addition to indices of the swing type and the ball speed of each shot data represented by the pie chart, still another index (swing speed in this embodiment) may be represented by the amplitude change of the particle size Psize, so that it becomes easy to observe a large number of shot data.

Therefore, according to the data selection display change processing, enormous data may be displayed so as to be understood easier.

Meanwhile, in the above-described example, different data attributes are adopted as the data attribute (swing speed) during the data selection operation and the data attribute (user ID) during the data non-selection operation; however, the same data attribute may also be adopted.

In addition, in the processing at step S23, the particle size Psize of the particle 211 having the same attribute as the data attribute of the data selected particle 211 is enlarged and the particle size Psize of the particle 211 having the different attribute is reduced; however, it is possible that the processing unit 93 only enlarges or reduces.

Also, in the above-described example, the swing speed is adopted as the data attribute represented by the amplitude change of the particle size Psize during the data selection operation at step S24; however, the data attribute other than the swing speed may also be adopted.

Similarly, at step S23, the user ID is adopted as the data attribute for enlarging or reducing the particle size Psize; however, the data attribute other than the user ID may also be adopted.

For example, as the data attribute adopted in the processing at steps S23 and S24, the user may set an arbitrary data attribute from the setting screen.

<S. Another Example of Particle Stereoscopic Image>

Next, another particle stereoscopic image which the processing unit 93 may display in the particle display area 212 is described.

Assuming that the particle stereoscopic image in which the particles 211 are stereoscopically distributed on the side surface of the conical shape as illustrated in FIG. 4 is the first particle stereoscopic image which the processing unit 93 may display, the processing unit 93 may generate at least three types of particle stereoscopic images which are a second particle stereoscopic image in addition to the same and a third particle stereoscopic image and display them on the display 51. The type of the particle stereoscopic image displayed in the particle display area 212 may be arbitrarily set by the user from the setting screen, for example.

<8.1 Second Particle Stereoscopic Image>

Figure 15:
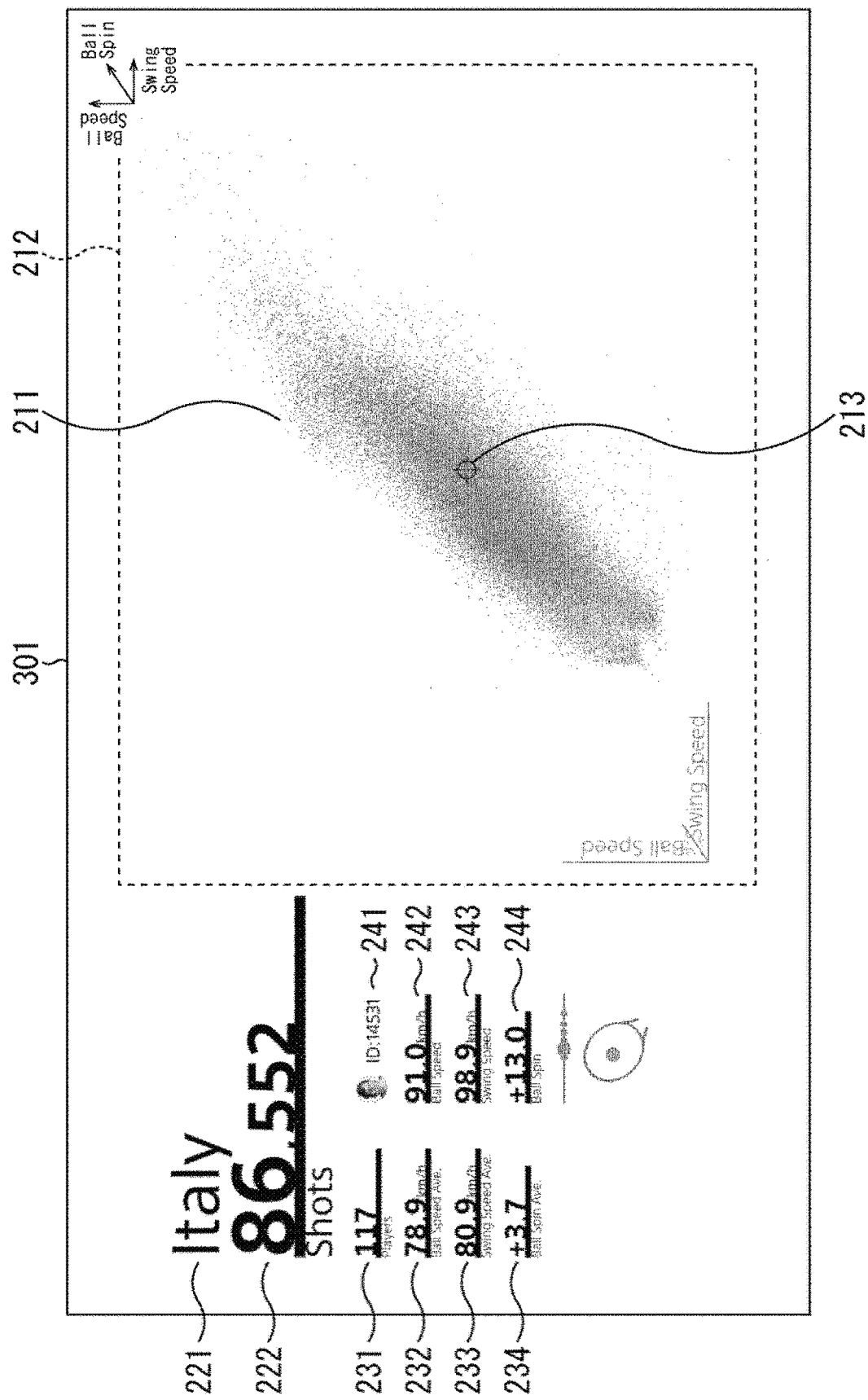
FIG. 15 is a view illustrating an example of a processed image using a second particle stereoscopic image.
Figure 16:
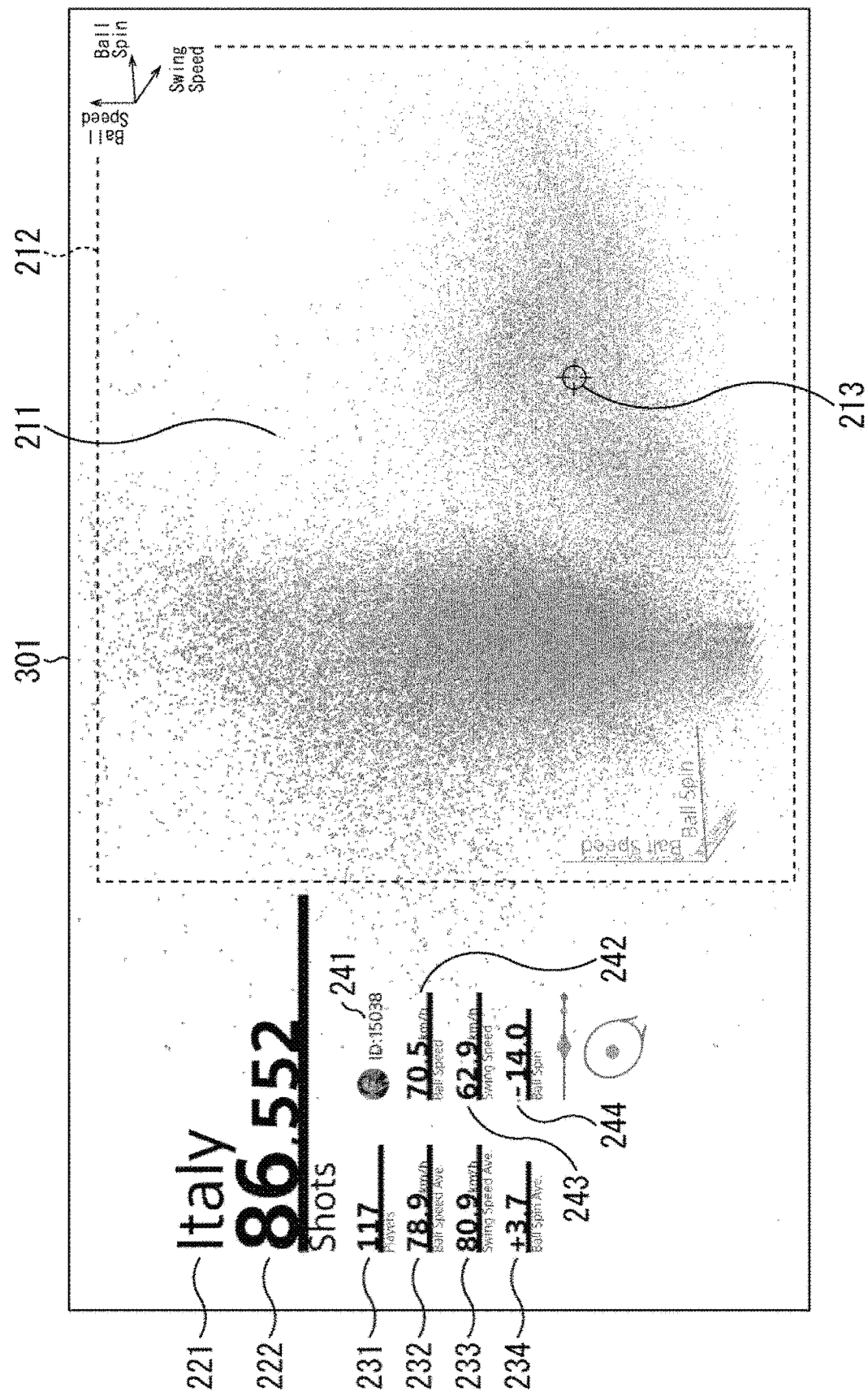
FIG. 16 is a view illustrating an example of the processed image using the second particle stereoscopic image.

FIGS. 15 and 16 illustrate an example of the processed image 301 in which the second particle stereoscopic image is displayed in the particle display area 212.

In the processed image 301 in FIGS. 15 and 16, a configuration other than the particle stereoscopic image displayed in the particle display area 212 is similar to that of the processed image 201 in FIG. 4 or the like, for example, so that, the description thereof is omitted.

In the particle display area 212 in FIGS. 15 and 16, the particle stereoscopic image in which the respective shot data are stereoscopically distributed in a three-axis distribution diagram using the particles 211 with one axis assigned to the swing speed, one axis assigned to the ball speed, and one axis assigned to the ball spin is displayed.

The viewpoint of the particle stereoscopic image displayed in the particle display area 212 is different between FIGS. 15 and 16. The viewpoint of the particle stereoscopic image may be changed by operating the mouse and the controller of the input unit 92.

For example, in the processed image 301 in FIGS. 15 and 16 also, in a case of color display, the particles 211 are drawn in different colors for each swing type, and in a case of monochrome display (gray display), they are drawn in different gray values for each swing type. As a result, a ratio of data for each swing type may be understood at a glance.

In addition, the size of the particle 211 is determined by the particle size determination processing in FIG. 8. As a result, the particle size Psize is determined according to the number of shot data to be displayed and the space size of the particle display area 212, so that it is possible to display in unified density regardless of the number of data.

Furthermore, while the processed image 301 is being displayed, the above-described data selection display change processing is executed. As a result, in a case where the user does not perform the data selection operation, the amplitude of each particle 211 dynamically changes according to the lapse of time and the predetermined data attribute (for example, swing speed). On the other hand, in a case where the user performs the data selection operation, the particle 211 of the same data attribute (for example, user ID) as that of the data selected particle 211 is emphasized. Therefore, it is easy to discriminate the data having the same data attribute.

<8.2 Third Particle Stereoscopic Image>

Figure 17:
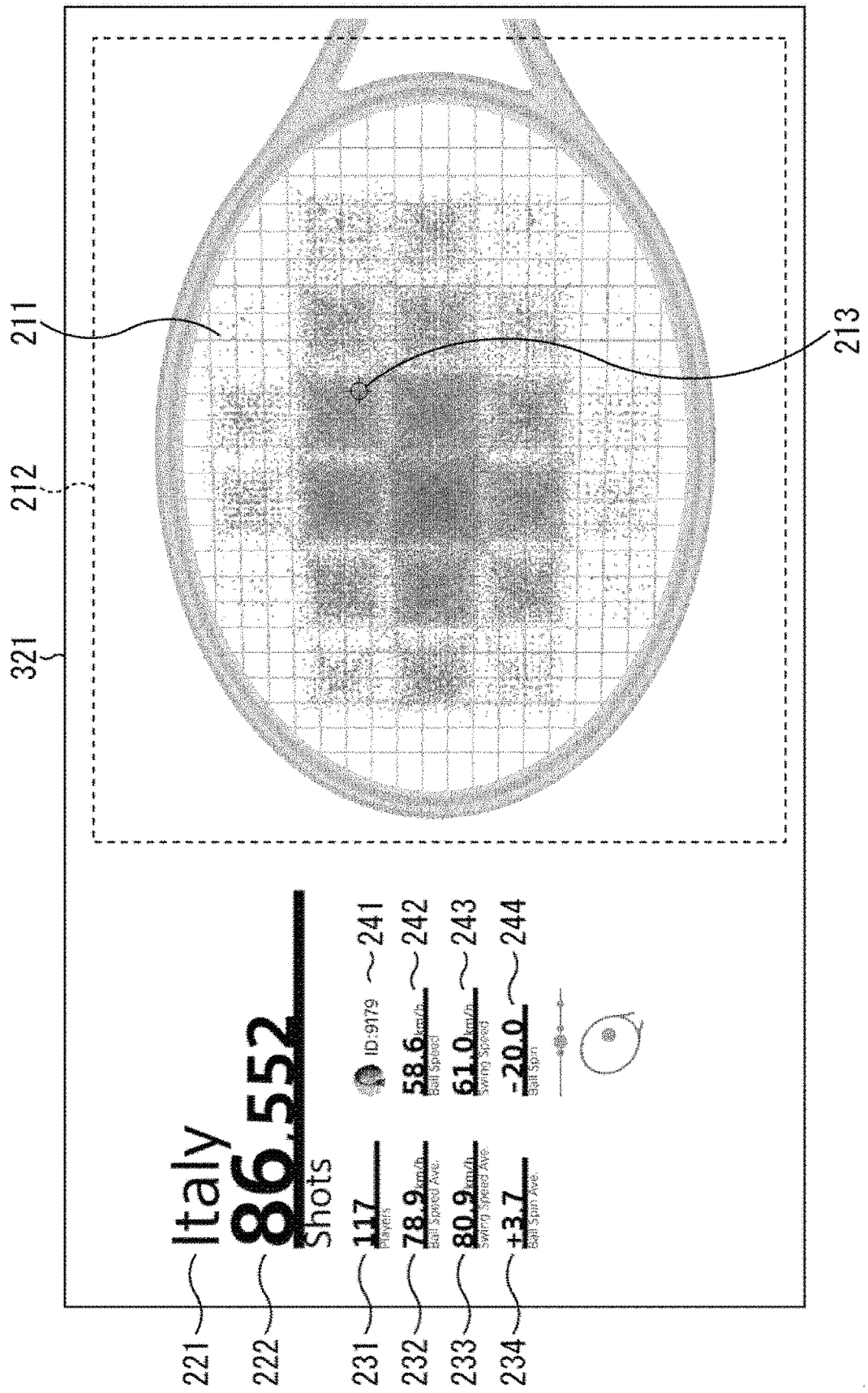
FIG. 17 is a view illustrating an example of a processed image using a third particle stereoscopic image.
Figure 18:
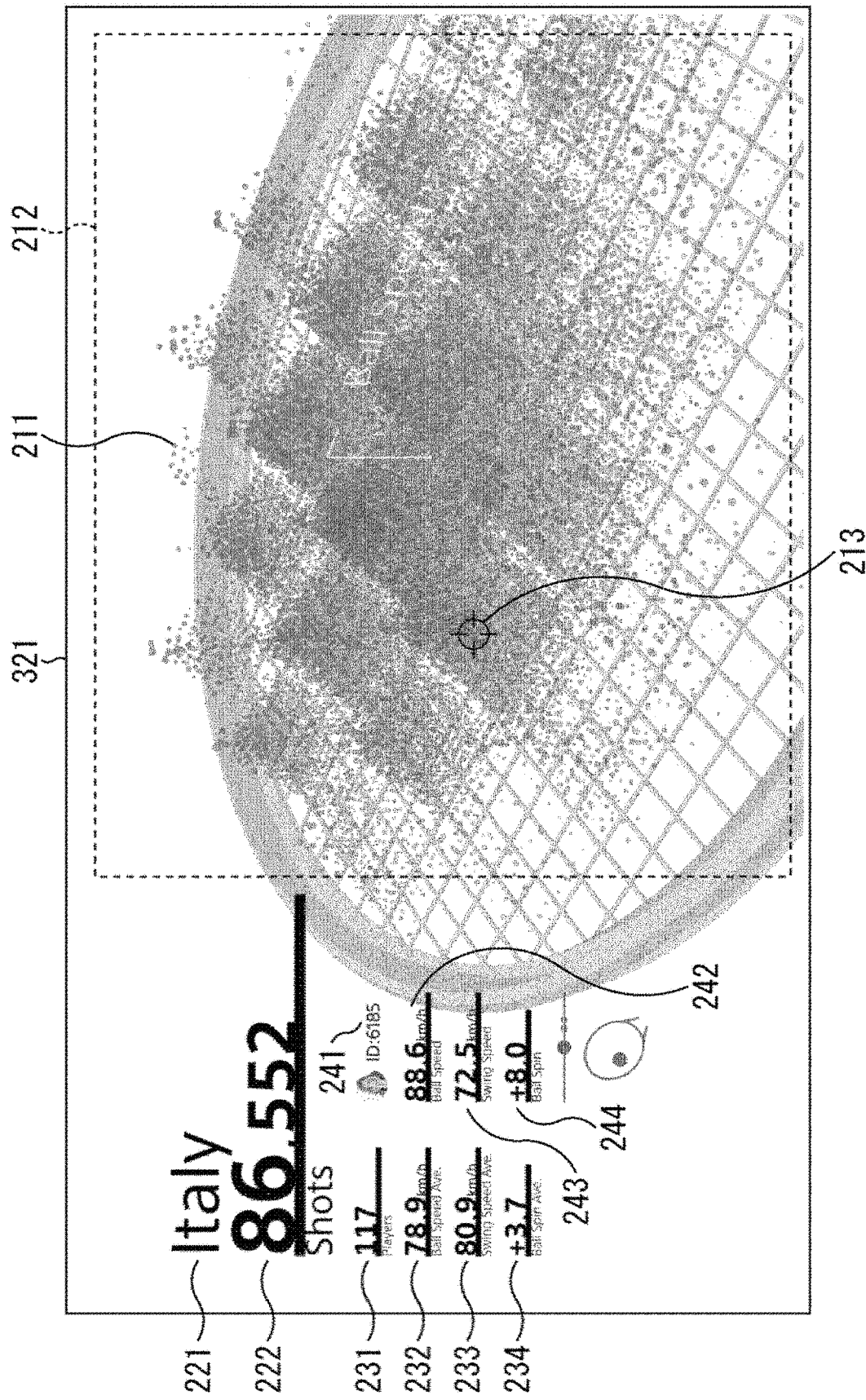
FIG. 18 is a view illustrating an example of the processed image using the third particle stereoscopic image.

FIGS. 17 and 18 illustrate an example of the processed image 321 in which a third particle stereoscopic image is displayed in the particle display area 212.

In the processed image 321 in FIGS. 17 and 18, a configuration other than the particle stereoscopic image displayed in the particle display area 212 is similar to that of the processed image 201 in FIG. 4 or the like, for example, so that the description thereof is omitted.

In the particle display area 212 in FIGS. 17 and 18, the particle stereoscopic image in which a face surface of a tennis racket is formed in a plane including two axes, an axis perpendicular to the face surface is assigned to the ball speed, and the respective shot data are stereoscopically distributed on the face surface by using the particles 211 is displayed.

In the particle stereoscopic image in FIGS. 17 and 18, the particle 211 is arranged in a corresponding area on the face surface on the basis of the information regarding the hitting position of the play data obtained from the server 13. A plurality of particles 211 arranged in the area corresponding to the hitting position is uniformly dispersed in the area. In the height direction perpendicular to the face surface, it is arranged in a higher position as the ball speed is faster on the basis of the value of the ball speed, and a distribution shape in an area unit is a quadrangular pyramid shape.

In FIGS. 17 and 18, the viewpoint of the particle stereoscopic image displayed in the particle display area 212 is different. The viewpoint of the particle stereoscopic image may be changed by operating the mouse and the controller of the input unit 92.

In the processed image 321 in FIGS. 17 and 18 also, the particles 211 are drawn in different colors for each swing type in color display, and drawn in different gray values for each swing type in a case of monochrome display (gray display), for example. As a result, a ratio of data for each swing type may be understood at a glance. Also, since the position corresponds to the ball speed in the height direction, tendency of the ball speed for each swing type may be understood at a glance.

In addition, the size of the particle 211 is determined by the particle size determination processing in FIG. 8. As a result, the particle size Psize is determined according to the number of shot data to be displayed and the space size of the particle display area 212, so that it is possible to display in unified density regardless of the number of data.

Furthermore, while the processed image 321 is being displayed, the above-described data selection display change processing is executed. As a result, in a case where the user does not perform the data selection operation, the amplitude of each particle 211 dynamically changes according to the lapse of time and the predetermined data attribute (for example, swing speed). On the other hand, in a case where the user performs the data selection operation, the particle 211 of the same data attribute (for example, user ID) as that of the data selected particle 211 is emphasized. Therefore, it is easy to discriminate the data having the same data attribute.

<9. Hardware Configuration>

Figure 19:
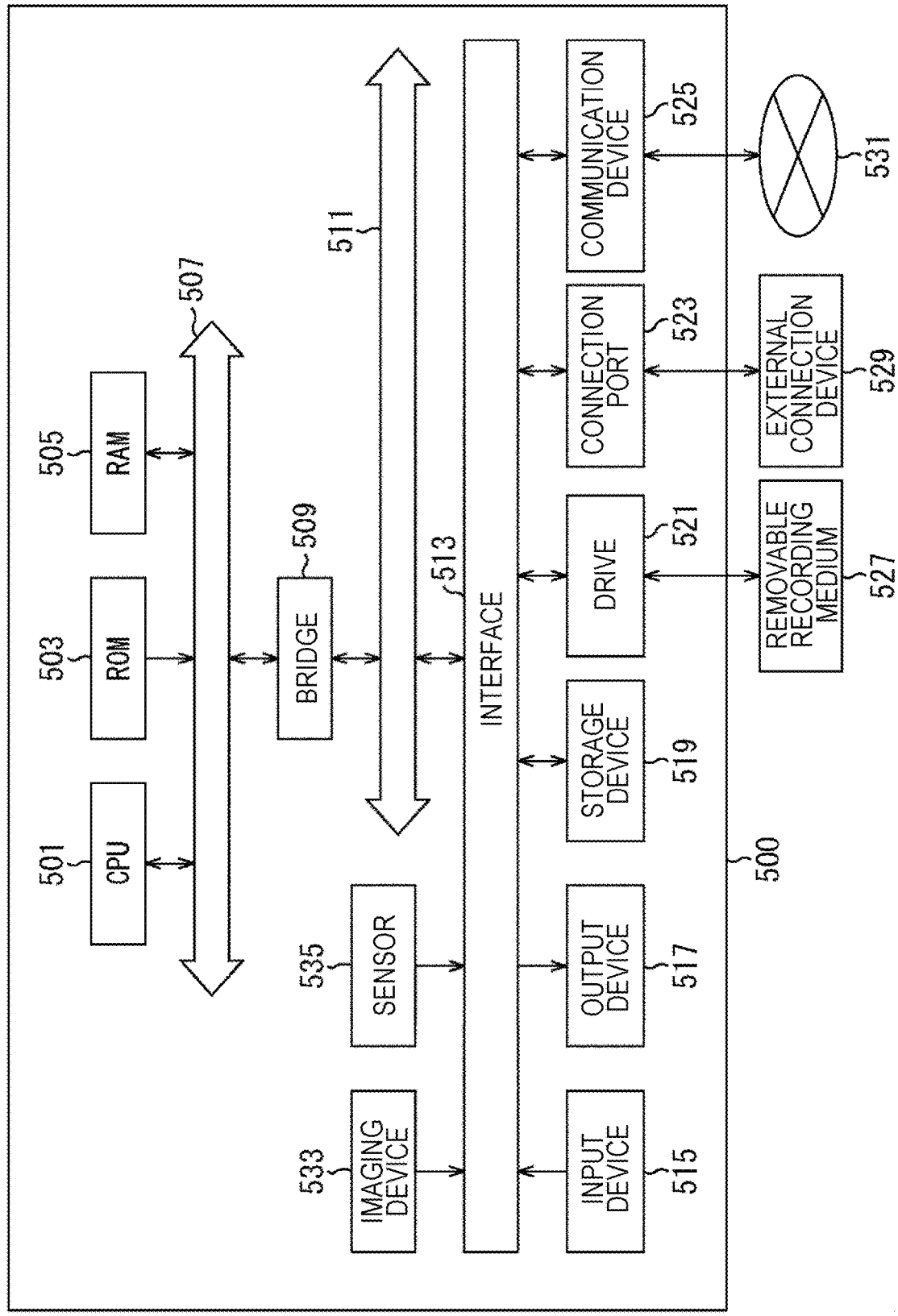
FIG. 19 is a block diagram illustrating a hardware configuration of an information processing device according to an embodiment of the present disclosure.

Next, with reference to FIG. 19, a hardware configuration of the information processing device according to the embodiment of the present disclosure is described.

FIG. 19 is a block diagram illustrating a hardware configuration example of the information processing device according to the embodiment of the present disclosure.

An information processing device 500 illustrated in FIG. 19 may realize, for example, the sensor device 11, the smartphone 12, and the server 13 in the above-described embodiment.

The information processing device 500 includes a central processing unit (CPU) 501, a read only memory (ROM) 503, a random access memory (RAM) 505. Also, the information processing device 500 may include a host bus 507, a bridge 509, an external bus 511, an interface 513, an input device 515, an output device 517, a storage device 519, a drive 521, a connection port 523, and a communication device 525. Furthermore, the information processing device 500 may include an imaging device 533 and a sensor 535, if necessary. In place of or in addition to the CPU 501, the information processing device 500 may include a processing circuit such as a digital signal processor (DSP), an application specific integrated circuit (ASIC), or a field-programmable gate array (FPGA).

The CPU 501 serves as an arithmetic processing device and a control device and controls overall operation in the information processing device 500 or a part thereof according to various programs recorded in the ROM 503, the RAM 505, the storage device 519, or a removable recording medium 527. The ROM 503 stores the program used by the CPU 501, operation parameters and the like. The RAM 505 temporarily stores the program to be used in execution of the CPU 501, parameters which change as appropriate in the execution thereof and the like. The CPU 501, the ROM 503, and the RAM 505 are mutually connected by the host bus 507 configured by an internal bus such as a CPU bus. Furthermore, the host bus 507 is connected to the external bus 511 such as a peripheral component interconnect/interface (PCI) bus via the bridge 509.

The input device 515 is a device operated by the user, such as a mouse, a keyboard, a touch panel, a button, a switch, and a lever, for example. The input device 515 may be, for example, a remote control device using infrared rays or other radio waves, or may be an external connection device 529 such as a portable phone compliant with operation of the information processing device 500. The input device 515 includes an input control circuit which generates an input signal on the basis of the information input by the user and outputs the same to the CPU 501. By operating the input device 515, the user inputs various data to the information processing device 500 and provides direction of processing operation.

The output device 517 is configured by a device capable of notifying the user of the obtained information by using a sense such as visual sense, hearing sense, or tactile sense. The output device 517 may be, for example, a display device such as a liquid crystal display (LCD) or an organic electroluminescence (EL) display, a sound output device such as a speaker or a headphone, a vibrator, or the like. The output device 517 outputs a result obtained by the processing of the information processing device 500 as a video such as text or image, sound such as voice or audio, vibration, or the like.

The storage device 519 is a device for storing data configured as an example of a storage unit of the information processing device 500. The storage device 519 is configured by, for example, a magnetic storage unit device such as a hard disk drive (HDD), a semiconductor storage device, an optical storage device, a magneto-optical storage device or the like. The storage device 519 stores, for example, program executed by the CPU 501, various data, various data obtained from the outside, and the like.

The drive 521 is a reader/writer for the removable recording medium 527 such as a magnetic disk, an optical disk, a magneto-optical disk, a semiconductor memory, and is incorporated in the information processing device 500 or externally attached thereto. The drive 521 reads out the information recorded in the attached removable recording medium 527 and outputs the same to the RAM 505. In addition, the drive 521 writes the recording on the attached removable recording medium 527.

The connection port 523 is a port for connecting a device to the information processing device 500. The connection port 523 may be, for example, a universal serial bus (USB) port, an IEEE 1394 port, a small computer system interface (SCSI) port or the like. In addition, the connection port 523 may be an RS-232C port, an optical audio terminal, a High-Definition Multimedia Interface (HDMI) (registered trademark) port or the like. By connecting the external connection device 529 to the connection port 523, various types of data may be exchanged between the information processing device 500 and the external connection device 529.

The communication device 525 is, for example, a communication interface configured by a communication device or the like for connecting to a communication network 531. The communication device 525 may be, for example, a communication card or the like for local area network (LAN), Bluetooth (registered trademark), Wi-Fi, or Wireless USB (WUSB). Also, the communication device 525 may be a router for optical communication, a router for asymmetric digital subscriber line (ADSL), a modem for various communications or the like. For example, the communication device 525 transmits and receives signals and the like using a predetermined protocol such as TCP/IP with the Internet and other communication devices. Also, the communication network 531 connected to the communication device 525 is a wired or wireless network, and may include, for example, the Internet, home LAN, infrared communication, radio wave communication, satellite communication or the like.

The imaging device 533 is a device which generates a captured image by capturing an image of a real space using various members such as an imaging element such as a complementary metal oxide semiconductor (CMOS) or a charge coupled device (CCD) and a lens for controlling image forming of a subject image on the imaging element, for example. The imaging device 533 may capture a still image or may capture a moving image.

The sensor 535 is, for example, various sensors such as an acceleration sensor, an angular speed sensor, a geomagnetic sensor, an illuminance sensor, a temperature sensor, an atmospheric pressure sensor, or a sound sensor (microphone). The sensor 535 obtains information regarding a state of the information processing device 500 itself such as attitude of a casing of the information processing device 500, and information regarding a surrounding environment of the information processing device 500 such as brightness and noise around the information processing device 500, for example. The sensor 535 may also include a GPS receiver which receives a global positioning system (GPS) signal and measures the latitude, longitude, and altitude of the device.

An example of the hardware configuration of the information processing device 500 as heretofore described. Each of the above-described components may be configured using a general-purpose member, or may be configured with hardware specialized for the function of each component. Such a configuration may be appropriately changed according to the technical level at the time of implementation.

The embodiment of the present disclosure may include, for example, the information processing device (sensor device 11, smartphone 12, or server 13), the system (information processing system 1), the information processing method executed by the information processing device or the system, the program for allowing the information processing device to function, and the non-transitory concrete medium in which the program is recorded as described above.

Although preferred embodiments of the present disclosure are described above in detail with reference to the attached drawings, the technical scope of the present disclosure is not limited to such examples. It as clear that one of ordinary skill an the technical field of the present disclosure may conceive of various modifications or corrections within the scope of the technical idea recited in claims, and it is understood that they also naturally belong to the technical scope of the present disclosure.

For example, in the above-described embodiment, an example in which the shot data having a plurality of data attributes is generated on the basis of the sensor signal output from the sensor device 11 attached to a predetermined portion of the racket 41, and the particle size determination processing and the data selection display change processing of the present, disclosure are applied to the display of the shot data is described.

However, it is also possible that the sensor device 11 is attached to a hitting tool such as a table tennis racket, a golf club, a baseball bat, for example, and the particle size determination processing and the data selection display change processing of the present disclosure are applied to the display of the shot data generated from the sensor signal output from the sensor device 11. If the hitting tool to which the sensor device 11 is attached is different, the data attribute obtained as the shot data may also be different.

Also, the particle size determination processing and the data selection display change processing according to the present disclosure may be applied to not only the data based on the sensor signal output from the sensor device 11 but also arbitrary data having a plurality of data attributes. That is, it is possible to display the enormous data so as to be easily understood by stereoscopically distributing the data as the particles according to the values of a plurality of data attributes, and executing the particle size determination processing and the data selection display change processing of the present disclosure.

In addition, the effects described in this specification are merely illustrative or exemplary, and are not limiting. That is the technology according to the present disclosure may exhibit other effects obvious to those skilled in the art from the description of this specification together with or in place of the above-described effects.

In this specification, the steps described in the flowcharts may be of course performed in chronological order according to the described order; it is not always necessary that they are processed in the chronological order and they may also be executed in parallel, or at necessary timing when a call is issued, for example.

Also, in this specification, a system is intended to mean assembly of a plurality of components (devices, modules (parts) and the like) and it does not matter whether or not all the components are in the same casing. Therefore, a plurality of devices stored in different casings connected through a network and one device obtained by storing a plurality of modules in one casing are the systems.

The embodiment of the present disclosure is not limited to the above-described embodiments and may be variously changed without departing from the gist of the present disclosure.

For example, it is possible to adopt a combination of all or some of a plurality of embodiments described above.

For example, the present technology may be configured as cloud computing in which a function is shared by a plurality of devices through the network to process together.

Also, each step described in the above-described flowchart may be executed by one device or executed by a plurality of devices in a shared manner.

Furthermore, in a case where a plurality of processes is included in one step, a plurality of processes included in one step may be executed by one device or by a plurality of devices in a shared manner.

Meanwhile, the effects described in this specification are illustrative only and are not limited; the effects other than those described in this specification may also be included.

Meanwhile, the present technology may also have following configurations.

(1)

An information processing device provided with:

a data obtaining unit which obtains a predetermined number of data; and an output unit which outputs first image control data for controlling to display a particle stereoscopic image in which particles corresponding to the data are stereoscopically distributed with a particle size determined according to the number of data of the obtained data.

(2)

The information processing device according to (1) described above, in which the first image control data is data for controlling to display the particle stereoscopic image in which the particle size is determined according to a space size for displaying the particle stereoscopic image in addition to the number of data of the obtained data.

(3)

The information processing device according to (1) or (2) described above, in which the output unit also outputs second image control data for changing the particle size of each particle of the particle stereoscopic image according to lapse of time in a case where a predetermined particle is not selected in the particle stereoscopic image.

(4)

The information processing device according to (3) described above, in which the output unit outputs the second image control data having different amplitude of the particle size according to a data attribute of the data.

(5)

The information processing device according to any one of (1) to (4) described above, in which the output unit also outputs third image control data for emphasizing a particle having the same data attribute as the data attribute of the data of the selected particle in a case where a predetermined particle is selected in the particle stereoscopic image.

(6)

The information processing device according to (5) described above, in which the third image control data is data for enlarging/displaying the particle size of the particle having the same data attribute as the data attribute of the data of the selected particle as emphasized display.

(7)

The information processing device according to (5) or (6) described above, in which the third image control data is data for reducing/displaying the particle size of the particle other than the particle having the same data attribute as the data attribute of the data of the selected particle as emphasized display.

(8)

The information processing device according to any one of (5) to (7) described above, in which the third image control data is data for enlarging/displaying the particle size of the particle having the same data attribute as the data attribute of the data of the selected particle and reducing/displaying the particle size of the particle other than this particle as emphasized display.

(9)

The information processing device according to any one of (1) to (8), further provided with:

a processing unit which generates the first image control data.

(10)

The information processing device according to any one of (1) to (9) described above, in which the first image control data is data for controlling to display the particle stereoscopic image in which the particles are distributed on a side surface of a conical shape.

(11)

A program which allows a computer to serve as:

a data obtaining unit which obtains a predetermined number of data; and an output unit which outputs image control data for controlling to display a particle stereoscopic image in which particles corresponding to the data are stereoscopically distributed with a particle size determined according to the number of data of the obtained data.

(12)

An information processing system provided with:

a first information processing device; and a second information processing device, the first information processing device storing a predetermined number of data and transmitting to the second information processing device, and the second information processing device provided with:

a data obtaining unit which obtains the predetermined number of data; and an output unit which outputs image control data for controlling to display a particle stereoscopic image in which particles corresponding to the data are stereoscopically distributed with a particle size determined according to the number of data of the obtained data.

REFERENCE SIGNS LIST

11 Sensor device
12 Smartphone
13 Server
14 PC
81 Storage unit
82 Processing unit
83 Communication unit
91 Communication unit
92 Input unit
93 Processing unit
94 Output unit
95 Storage unit
211 Particle
212 Particle display area
500 Information processing device
501 CPU
503 ROM
505 RAM
515 Input device
517 Output device
519 Storage device unit
521 Drive
525 Communication device

The invention claimed is:

1. An information processing device comprising:
a data obtaining unit which obtains a predetermined number of data; and
an output unit which outputs first image control data for controlling to display a particle stereoscopic image in which particles corresponding to the data are stereoscopically distributed with a particle size determined according to the number of data of the obtained data,
wherein the output unit also outputs second image control data for changing the particle size of each particle of the particle stereoscopic image according to lapse of time in a case where a predetermined particle is not selected in the particle stereoscopic image, and wherein the data obtaining unit and the output unit are each implemented via at least one processor.

2. The information processing device according to claim 1, wherein the first image control data is data for controlling to display the particle stereoscopic image in which the particle size is determined according to a space size for displaying the particle stereoscopic image in addition to the number of data of the obtained data.

3. The information processing device according to claim 1, wherein the output unit outputs the second image control data having different amplitude of the particle size according to a data attribute of the data.

4. The information processing device according to claim 1, wherein the output unit also outputs third image control data for emphasizing a particle having the same data attribute as the data attribute of the data of the selected particle in a case where a predetermined particle is selected in the particle stereoscopic image.

5. The information processing device according to claim 4, wherein the third image control data is data for enlarging/displaying the particle size of the particle having the same data attribute as the data attribute of the data of the selected particle as emphasized display.

6. The information processing device according to claim 4, wherein the third image control data is data for reducing/displaying the particle size of the particle other than the particle having the same data attribute as the data attribute of the data of the selected particle as emphasized display.

7. The information processing device according to claim 4, wherein the third image control data is data for enlarging/displaying the particle size of the particle having the same data attribute as the data attribute of the data of the selected particle and reducing/displaying the particle size of the particle other than this particle as emphasized display.

8. The information processing device according to claim 1, further comprising:
a processing unit which generates the first image control data,
wherein the processing unit is implemented via at least one processor.

9. The information processing device according to claim 1, wherein the first image control data is data for controlling to display the particle stereoscopic image in which the particles are distributed on a side surface of a conical shape.

10. A non-transitory computer-readable medium having embodied thereon a program, which when executed by a computer causes the computer to execute a method, the method comprising:
obtaining a predetermined number of data;
outputting first image control data for controlling to display a particle stereoscopic image in which particles corresponding to the data are stereoscopically distributed with a particle size determined according to the number of data of the obtained data; and
outputting second image control data for changing the particle size of each particle of the particle stereoscopic image according to lapse of time in a case where a predetermined particle is not selected in the particle stereoscopic image.

11. An information processing system comprising:
a first information processing device; and
a second information processing device,
the first information processing device storing a predetermined number of data and transmitting to the second information processing device, and
the second information processing device provided with:
a data obtaining unit which obtains the predetermined number of data; and
an output unit which outputs first image control data for controlling to display a particle stereoscopic image in which particles corresponding to the data are stereoscopically distributed with a particle size determined according to the number of data of the obtained data,
wherein the output unit also outputs second image control data for changing the particle size of each particle of the particle stereoscopic image according to lapse of time in a case where a predetermined particle is not selected in the particle stereoscopic image, and
wherein the data obtaining unit and the output unit are each implemented via at least one processor.

12. An information processing method comprising:
obtaining a predetermined number of data;
outputting first image control data for controlling to display a particle stereoscopic image in which particles corresponding to the data are stereoscopically distributed with a particle size determined according to the number of data of the obtained data; and
outputting second image control data for changing the particle size of each particle of the particle stereoscopic image according to lapse of time in a case where a predetermined particle is not selected in the particle stereoscopic image.

* * * * *